(12) United States Patent
Huang et al.

(10) Patent No.: US 10,868,737 B2
(45) Date of Patent: Dec. 15, 2020

(54) SECURITY POLICY ANALYSIS FRAMEWORK FOR DISTRIBUTED SOFTWARE DEFINED NETWORKING (SDN) BASED CLOUD ENVIRONMENTS

(71) Applicant: ARIZONA BOARD OF REGENTS ON BEHALF OF ARIZONA STATE UNIVERSITY, Scottsdale, AZ (US)

(72) Inventors: Dijiang Huang, Chandler, AZ (US); Ankur Chowdhary, Tempe, AZ (US); Sandeep Pisharody, Chandler, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 304 days.

(21) Appl. No.: 15/795,036

(22) Filed: Oct. 26, 2017

(65) Prior Publication Data
US 2018/0115470 A1     Apr. 26, 2018

Related U.S. Application Data

(60) Provisional application No. 62/413,264, filed on Oct. 26, 2016.

(51) Int. Cl.
*H04L 12/26* (2006.01)
*H04L 29/06* (2006.01)
(Continued)

(52) U.S. Cl.
CPC ........ *H04L 43/026* (2013.01); *H04L 41/0873* (2013.01); *H04L 41/0893* (2013.01); *H04L 63/20* (2013.01); *H04W 28/24* (2013.01)

(58) Field of Classification Search
CPC ............... H04L 41/0873; H04L 43/026; H04L 41/0893; H04L 63/20; H04W 28/24
See application file for complete search history.

(56) References Cited

U.S. PATENT DOCUMENTS 8,837,738 B2   9/2014  Huang et al.
9,160,761 B2   10/2015 Lee et al.
(Continued)

FOREIGN PATENT DOCUMENTS

WO    WO 2014/160479    10/2014

OTHER PUBLICATIONS

"Floodlight" Accessed from the Internet URL: <http://www.projectfloodlight.org/floodlight> 2019.
(Continued)

*Primary Examiner* — Philip J Chea
*Assistant Examiner* — Mohammed Ahmed
(74) *Attorney, Agent, or Firm* — Elliott, Ostrander & Preston, P.C.

(57) ABSTRACT

Embodiments are disclosed that relate generally to software defined networking (SDN), and more particularly, but not by way of limitation, to devices, systems, and methods for a security policy analysis framework for distributed SDN-based cloud computing environments. The ease of programmability in SDN makes it a great platform implementation of various initiatives that involve application deployment, dynamic topology changes, and decentralized network management in a multi-tenant data center environment. However, implementing security solutions in such an environment is fraught with policy conflicts and consistency issues with the hardness of this problem being affected by the distribution scheme for the SDN controllers. In the embodiments disclosed herein, a security policy analysis framework is implemented on an OpenDaylight SDN controller that has comprehensive conflict detection and resolution modules to ensure that no two flow rules in a distributed SDN-based cloud environment have conflicts at any layer. This assures consistent conflict-free security policy implementation and preventing information leakage. In the embodiments dis-
(Continued)

closed herein, techniques are described for global prioritization of flow rules in a decentralized environment, for extending firewall rule conflict classification from a traditional environment to SDN flow rule conflicts by recognizing and classifying conflicts stemming from cross-layer conflicts, and providing strategies for unassisted resolution of these conflicts. Alternately, if administrator input is desired to resolve conflicts, a visualization scheme is implemented to help the administrators view the conflicts graphically.

14 Claims, 16 Drawing Sheets

(51) Int. Cl.
H04L 12/24 (2006.01)
H04W 28/24 (2009.01)

(56) References Cited

U.S. PATENT DOCUMENTS

| | | | |
|---|---|---|---|
| 9,357,331 B2 | 5/2016 | Huang | |
| 9,570,850 B2 | 2/2017 | Blakborn | |
| 2009/0133110 A1* | 5/2009 | Kumar | H04L 29/12122 726/8 |
| 2012/0084364 A1* | 4/2012 | Sivavakeesar | H04L 12/1818 709/205 |
| 2013/0194914 A1* | 8/2013 | Agarwal | H04L 41/0654 370/225 |
| 2014/0153577 A1* | 6/2014 | Janakiraman | H04L 47/122 370/392 |
| 2015/0043589 A1* | 2/2015 | Han | H04L 45/38 370/392 |
| 2015/0124809 A1* | 5/2015 | Edsall | H04L 47/20 370/390 |
| 2015/0326524 A1* | 11/2015 | Tankala | H04L 61/6022 709/245 |
| 2016/0044035 A1 | 2/2016 | Huang | |
| 2016/0142301 A1* | 5/2016 | Anand | H04L 45/54 370/389 |
| 2016/0241399 A1 | 8/2016 | Huang et al. | |
| 2017/0134268 A1* | 5/2017 | Easale | H04L 45/507 |
| 2017/0272411 A1 | 9/2017 | Huang et al. | |

OTHER PUBLICATIONS

"OpenFlow V1. 3.1" Tech. Rep., 2012, 128 pages.
"The opendaylight project," 2010, Accessed from the Internet URL: <https://www.opendaylight.org/>.
Alfaro et al., "Complete Analysis of Configuration Rules to Guarantee Reliable Network Security Policies," *International Journal of Information Security*, 2008, 7(2):103-122.
Al-Shaer & Hamed, "Firewall policy advisor for anomaly discovery and rule editing," *Integrated Network Management, 2003. IFIP/IEEE Eighth International Symposium*, 2003, 17-30.
Al-Shaer et al., "Conflict Classification and analysis of distributed firewall policies," *Selected Areas in Communication, IEEE Journal on*, 2005, 23(10):2069-2084.
Alsmadi & Xu, "Security of Software Defined Networks: A Survey," *Computers & Security*, 2015, Vo. 53, pp. 79-108.
Bartal et al., "Firmato: A novel firewall management toolkit," *ACM Transactions on Computer Systems*, 2004, 22(4):381-420.
Benson et al., "Network traffic characteristics of data centers in the wild," *Proceedings of the 10th ACM SIGCOMM conference on Internet measurement*, 2010, 267-280.
Berde et al., "ONOS: Towards an Open, Distributed SDN OS," *Proceedings of the third workshop on Hot topics in software defined networking*, 2014, pp. 1-6.

Bostock, M., "D3.js Data-Driven Documents" Accessed from the Internet URL: <https://bost.ocks.org/mike/>, 2019, 4 pages.
Chowdhary et al., "SDN based scalable MTD Solution in Cloud Network," *Proceedings of the 2016 ACM Workshop on Moving Target Defense*, 2016, pp. 27-36.
Dixit et al., "Towards an elastic distributed SDN controller" *ACM SIGCOMM Computer Communication Review*, 2013, 43(4):7-12.
Eppstein & Muthukrishnan, "Internet packet filter management and rectangle geometry," *Proceedings of the twelfth annual ACM-SIAM symposium on Discrete algorithms*, Society for Industrial and Applied Mathematics, 2001, 827-835.
Fayazbakhsh et al., "Enforcing network-wide policies in the presence of dynamic middlebox actions using flowtags," *Proc. USENIX NSDI*, 2014, pp. 533-546.
Francois et al., "Networking Security Through Software Defined Networking: A Survey," *Proceedings of the Conference on Principles, Systems and Applications of IP Telecommunications*, 2014, 13 Pages.
Fu et al., "IPSec/VPN security policy: Correctness, conflict detection, and resolution," *Policies for Distributed Systems and Networks*, 2001, pp. 39-56.
Gupta & McKeown, "Algorithms for packet classification," *Network IEEE*, 2001, 15(2):24-32.
Han & Lei, "A survey on policy languages in network and security management," *Computer Networks*, 2012, 56:477-489.
Holten, D., "Hierarchical edge bundles: Visualization of adjacency relations in hierarchical data," *Visualization and Computer Graphics, IEEE Transaction*, 2006, 12(5):741-748.
Hu et al., "FAME: A Firewall Anomaly Management Environment" *SafeConfig*, 2010, pp. 17-26.
Hu et al., "FLOWGUARD: building robust firewalls for software-defined networks," *Proceedings of the third workshop on Hot topics in software defined networking*, 2014, 97-102.
Javid et al., "A layer2 firewall for software defined network," *Information Assurance and Cyber Security (CIACS)*, 2014, pp. 39-42.
Jimenez et al., "On the controller placement for designing a distributed sdn control layer," *Networking Conference, 2014 IFIP*, 2014, 1-9.
Kazemian et al., "Header space analysis: Static checking for networks," *Presented as part of the 9th USENIX Symposium on Networked Systems Design and Implementation*, 2012, 113-126.
Khurshid et al., "Veriflow: Verifying network-wide invariants in real time" *10th USENIX Symposium on Networked System Design and Implementation*, 2013, pp. 15-27.
Koponen et al., "Onix: A Distributed Control Platform for large-scale Production Networks" *OSDI*, 2010, vol. 10, 14 pages.
Kreutz et al., "Software-Defined Networking: A Comprehnsive Survey" *Proceedings of the IEEE*, 2015, 103(1):14-76.
Lee et al., "No More Middlebox: Integrate Processing into Network." *ACM SIGCOMM Computer Communication Review*, 2010, vol. 40, pp. 459-460.
Levin et al., "Logically Centralized? State Distribution trade-offs in software defined networks" *Proceedings of the first workshop on Hot topics in software defined networks*, ACM, 2012, pp. 1-6.
Liu et al., "Design of the Multi-Level Security Network Switch System Which Restricts Covert Channel," *Communication Software and Networks (ICCSN), 2011 IEEE 3rd International Conference*, 2011, pp. 233-237.
Liu et al., "Leveraging Software-Defined Networking for Security Policy Enforcement," *Information Sciences*, 2016, vol. 327, pp. 288-299.
Lupu & Sloman, "Conflict analysis for management policies," *Integrated Network Management V.*, 1997, 430-443.
Lupu & Sloman, "Conflicts in policy-based distributed systems management," *Software Engineering, IEEE Transaction*, 1999, 25(6):852-869.
Mansmann et al., "Visual Analysis of Complex Firewall Configurations," *Proceedings of the ninth international symposium on visualization for cyber security*, 2012, pp. 1-8.
Mayer et al., "Fang: A Firewall Analysis Engine," *Security and Privacy, Proceedings. 2000 IEEE Symposium*, 2000, pp. 177-187.

(56) References Cited

OTHER PUBLICATIONS

Monsanto et al., "Composing software defined networks," *NSDI*, 2013, pp. 1-13.

Morrison, D. R., "Patricia—practical algorithm to retrieve information coded in alphanumeric," *Journal of the ACM*, 1968, 15(4):514-534.

Natarajan et al., "Efficient conflict detection in flow-based virtualized networks," *Computing, Networking and Communications, 2012 International Conference*, 2012, 690-696.

Phemius et al., "DISCO: Distributed SDN Controllers in a Multi-Domain Environment," *2014 IEEE Network Operations and Management Symposium (NOMS)*, 2014, pp. 1-4.

Pisharody et al., "Brew: A Security Policy Analysis Framework for Distributed SDN-Based Cloud Environments" *IEEE Transactions on Dependable and Secure Computing*, 2017, 14 pages.

Pisharody et al., "Security Policy Checking in Distributed SDN based Clouds" IEEE Conference on Communications and Network Security, 2016, 9 pages.

Poornaselvan et al., "Efficient ip lookup algorithm," *Strengthening the Role of ICT in Decelopment*, 2007, p. 111.

Porras et al., "A security enforcement kernel for openflow networks." *Proceedings of the first workshop on Hot topics in software defined networks*, 2012, 121-126.

Qazi et al., "SIMPLE-frying MIddlebox Policy Enforcement Using SDN," *Proceedings of the ACM SIGCOMM 2013 Conference on SIGCOMM*, 2013, pp. 27-38.

Reingold & Tilford, "Tidier drawings of trees," *Software Engineering, IEEE Transaction*, 1981, 2:223-228.

Schneider, Fred B., "Least Privilege and More" *Computer Systems Theory, Technology, and Applications*, 2004, pp. 253-258.

Sezer et al., "Are we ready for sdn? Implementation challenges for software-defined networks," *Communications Magazine*, IEEE, 2013, 51(7):36-43.

Sherry et al., "Making Middleboxes Someone Else's Problem: Network Processing as a Cloud Service," *ACM SIGCOMM Computer Communication Review*, 2012, 42(4):13-24.

Shin et al., "Fresco: Modular composable security services for software-defined networks" 2013, 16 pages.

Singh et al., "Welcome to the open daylight ux dlux project," Sep. 2013, Accessed from the Internet URL <https://wiki.opendaylight.org/view/OpenDaylight_dlux >.

Strassner & Schleimer, Suh et al., "Policy framework definition language," Accessed from the Internet URL <https://www.ietf.org/proceedings/44/I-D/draft-ietf-policy-framework-pfdl-00-txt> 1998.

Suh et al., "Building firewall over the software-defined network controller" *Advanced Communication Technology, 2014 16th International Conference*, 2014, 744-748.

Tavakoli et al., "Applying NOX to the datacenter" *HotNets*, 2009, 6 pages.

Tootoonchian & Ganjali, "Hyperflow: A Distributed Control Plane for OpenFlow," *Proceedings of the 2010 internet network management conference on research on enterprise networking*, 2010, 6 pages.

Tran et al., "PolicyVis: Firewall Security Policy Visualization and Inspeciation," *21st Large Installation System Administration Conference*, 2007, 16 pages.

Yackoski et al., "Applying Self-Shielding Dynamics to the Network Architecture," *Moving Target Defence II*, 2013, pp. 97-115.

Yeganeh & Ganjali, "Kandoo: A Framework for Efficient and Scalable Offloading of Control Applications," *Proceedings of the first workshop on Hot topics in software defined networks* 2012, pp. 19-24.

Yeganeh et al., "On scalability of software-defined networking," *Communications magazine, IEEE*, 2013, 51(2):136-141.

Yuan et al., "Fireman: A Toolkit for Firewall Modeling and Analysis," *Security and Privacy, 2006 IEEE Symposium*, 2006, 15 pages.

\* cited by examiner

SECURITY POLICY ANALYSIS FRAMEWORK FOR DISTRIBUTED SOFTWARE DEFINED NETWORKING (SDN) BASED CLOUD ENVIRONMENTS

CROSS REFERENCE TO RELATED APPLICATIONS

The present application claims priority to U.S. Application No. 62/413,264 filed Oct. 26, 2016 and incorporated herein by reference in its entirety.

BACKGROUND

The present disclosure relates generally to software defined networking (SDN), and more particularly, but not by way of limitation, to devices, systems, and methods for a security policy analysis framework for distributed SDN-based cloud computing environments.

Software Defined Networks (SDN) implemented using an Network Function Virtualization (NFV) architecture has the potential to be a holistic security solution with all the functionalities of a traditional network firewall, along with the ability to have granular control over traffic flow. SDN is a transformative approach to network design and implementation, based on the premise of separating the control of network functions from the network devices themselves (switches, routers, firewalls, load balances, etc.). Using the OpenFlow protocol, SDN switches can leverage the flexibility afforded by the ability to access header information from several layers of the Open Systems Interconnection (OSI) stack, allowing it to satisfy functionalities traditionally fulfilled by a multitude of physical devices. Along with the SDN support of programmable network interfaces, this flexibility makes SDN an ideal platform for multi-tenant data center deployments that require flexibility and dynamism. This is especially true in an Infrastructure-as-a-service (IaaS) cloud where Virtual Machines (VMs) are managed by tenants seeking technological and financial flexibility. However, the decoupling of data and control planes in SDN brings about scalability concerns owing to potential bottlenecks at the controller. Although a centralized controller can scale for a respectable enterprise network, it would likely fail for a data center deployment. While architectures have been explored for decentralizing the SDN architecture, they do not address flow rule management across this environment.

The flexibility and programmability of SDN allows for the ability to respond rapidly to changing user and security requirements and empowers users in a shared tenant environment to secure their own logical infrastructure in a perceivably private manner. Any security implementation by the tenant such as Intrusion Detection Systems (IDS), Intrusion Prevention Systems (IPS), Deep Packet Inspection (DPI), Virtual Private Networks (VPN), or Moving Target Defense (MTD) would be accomplished by installing new flow rules in the SDN-based cloud environment. However, the shared control plane leaves open the potential for conflicts between flow rules from different tenants. Unlike traditional environments where new rules can get added only through an administrator, abstraction of the data plane from the control plane leads to applications being able to introduce new flow rules into the controller through an API. When done without having an understanding of existing flow rules, the desired security policy or in an adversarial manner, this could result in potential conflicts as well. In a decentralized SDN-based cloud environment with multiple controllers, the policy conflict issue is amplified since conflicts could arise due to different controllers not being in sync, and not having the same view of the environment. To complicate matters further, a dynamically changing network topology adds its own wrinkles. Just as firewall conflicts in a traditional network limits effectiveness of a security infrastructure, conflicts between flow rules on the controller limits the effectiveness and impact of a security implementation in an SDN-based cloud environment. Amongst issues that are heightened in an SDN-based cloud environment are issues caused by flow rule chaining, cross-layer policy conflicts, partial matches, and set-field actions.

Substantial research has attempted to address the problems set forth above, significant amongst which are FortNOX and the Flowguard frameworks. While they deal effectively with direct flow violations, they do not tackle conflicts across addresses over multiple layers. Consider a multi-tenant SDN-based environment. Often, tenants use flat layer-2 topologies due to latency concerns, and the ability to conduct inline promiscuous monitoring using layer-2 devices. A natural extension would be to implement layer-2 flow rule policies. The data center itself might operate with flow rules based on layer-3 addresses. If different policy enforcement points enforce policies based on different layers, inconsistent actions could result. Conflicts across multiple layer addresses or cross-layer conflicts become severe in an SDN setup where each SDN switch, both physical and virtual, can be considered to be a distributed firewall instance, each with a different local view of the environment and policy.

While advances in SDN have made it central to deployment of a cloud environment, security mechanisms in SDN trail its applications. A basic SDN firewall is introduced as part of the Floodlight framework, wherein the first packet in a new flow is sent to the controller to be matched against a set of flow rules. The resulting action set is then sent to the OpenFlow switch. The action set is applied for the current flow, and cached for enforcement on all future flows matching the same conditions. One prior framework uses a layer-2 firewall for an SDN-based cloud environment using a tree topology for a small network using a PDX controller and restricted traffic flow as desired. Another framework uses a proof-of-concept version of a traditional layer-3 firewall over an SDN controller. However, none of these works address the problem of conflicting flow rules. VeriFlow is a proposed layer between the controller and switches which conducts real time verification of rules being inserted. It verifies that flow rules being implemented have no errors due to faulty switch firmware, control plane communication, reachability issues, configuration updates on the network, and routing loops. Pyretic deals effectively with direct policy conflicts, by placing them in a prioritized rule set much like the OpenFlow flow table. However, indirect security violations or inconsistencies caused by cross-layer conflicts in a distributed SDN-based cloud environment cannot be handled by Pyretic without a flow tracking mechanism. FRESCO introduces a Security Enforcement Kernel (SEK) and allows security services to provide reusable modules accessible through a Python API. While the SEK prioritizes rules from security applications to address conflicts, it does not tackle indirect security violations, partial violations or cross-layer conflicts. FortNOX is an extension to the NOX controller that implements role-based and signature based enforcement to ensure applications do not circumvent the existing security policy, thereby enforcing policy compliance and protecting the flow installation mechanism against adversaries. Conflict analysis in FortNOX doesn't consider inter-dependencies within flow tables, and decision making seems to follow a least permissive strategy instead of making a decision keeping the holistic nature of the environment in mind. Moreover, it uses only layer-3 and layer-4 information for conflict detection, which is incomplete since SDN flow rules could use purely layer-2 addresses. In addition FortNOX doesn't appear to be able to handle partial flow rule conflicts or cross-layer conflicts. Flowguard is a security tool specifically designed to resolve security policy violations in an OpenFlow network. Flowguard examines incoming policy updates and determines flow violations in addition to performing stateful monitoring. It uses several strategies to refine anomalous policies, most of which include rejecting a violating flow.

Onix facilitates distributed control in SDN by providing each instance of the distributed controller access to holistic network state information through an API. HyperFlow synchronizes the network state among the distributed controller instances while making them believe that they have control over the entire network. Kandoo is a framework tailored for a hierarchical controller setup. It separates out local applications that can operate using the local state of a switch; and lets the root controller handle applications that require network-wide state. DISCO is a distributed control plane that relies on a per domain organization, and contains an east-west interface that manages communication with other DISCO controllers. It is highly suitable for a hierarchically decentralized SDN controller environment. ONOS is an OS that runs on multiple servers, each of which acts as the exclusive controller for a subset of switches and is responsible for propagating state changes between the switches it controls.

The systems discussed above do not address cross-layer policy conflicts in distributed environments, or address administrator assistance free conflict resolution, which is very important in dynamic SDN-based cloud environments. To that end, a system is proposed having a new classification type to describe cross-layer conflicts. Using the formalism provided by this new type of flow rule conflict, the system detects and introduces mechanisms to resolve the conflicts without administrator assistance.

SUMMARY

This disclosure includes embodiments of devices, systems, and methods for a security policy analysis framework for distributed SDN-based cloud computing environments.

In some embodiments, a method of reducing conflicts between flow rules in an SDN-based cloud environment comprises receiving one or more flow rules; receiving a data structure comprising a reconciled rule identification field, a controller identification field, a global priority field, and a conflict resolution criteria field; separating atomic actions from the one or more flow rules; determining address space overlap between the one or more flow rules; detecting one or more conflicts between the one or more flow rules; classifying the one or more conflicts into intelligible conflicts and interpretive conflicts; automatically resolving intelligible conflicts; and resolving interpretive conflicts based on one or more resolution options contained in the conflict resolution criteria field.

In some embodiments, the atomic actions comprise permit actions, deny actions, and QoS actions. In some embodiments, intelligible conflicts comprise one or more of redundancy conflicts, shadowing conflict, and generalization conflict and interpretive conflicts comprise one or more of correlation conflicts, overlap conflicts, and imbrication conflicts. In some embodiments, the one or more resolution options comprise a least privilege option, a module security precedence option, an environmental calibration option, and an administrator assistance option. In some embodiments, the method further comprises creating visualization information corresponding to the one or more conflicts detected between the one or more flow rules. In some embodiments, the one or more flow rules are received from one or more of a configuration data store and an operational data store. In some embodiments, determining the address space overlap between the one or more flow rules comprises performing a Patricia Trie lookup process.

In some embodiments, a security policy analysis framework system for distributed SDN-base cloud environments comprises an analyzer device comprising a flow extraction engine that receives one or more flow rules and receives a data structure comprising a reconciled rule identification field, a controller identification field, a global priority field, and a conflict resolution criteria field; a processing device comprising: a flow prepping engine that separates atomic actions from the one or more flow rules; a conflict detection engine that determines address space overlap between the one or more flow rules, detects one or more conflicts between the one or more flow rules, and classifies the one or more conflicts into intelligible conflicts and interpretive conflicts; and a conflict resolution engine that resolves the one or more conflicts based on one or more resolution options contained in the conflict resolution criteria field; and a controller device.

In some embodiments, a non-transitory computer readable medium stores executable code which, when executed by at least one processor, performs the method of receiving one or more flow rules; receiving a data structure comprising a reconciled rule identification field, a controller identification field, a global priority field, and a conflict resolution criteria field; separating atomic actions from the one or more flow rules; determining address space overlap between the one or more flow rules; detecting one or more conflicts between the one or more flow rules; classifying the one or more conflicts into intelligible conflicts and interpretive conflicts; automatically resolving intelligible conflicts; and resolving interpretive conflicts based on one or more resolution options contained in the conflict resolution criteria field. In some embodiments, the method further comprises creating visualization information corresponding to the one or more conflicts detected between the one or more flow rules.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any embodiment of the present devices, systems, and methods, the term "substantially" may be substituted with "within [a percentage] of" what is specified, where the percentage includes 0.1, 1, 5, and/or 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus or kit that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, an apparatus, device, or structure that is configured in a certain way is configured in at least that way, but it can also be configured in other ways than those specifically described.

Any embodiment of any of the present devices, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiments depicted in the figures.

DESCRIPTION OF ILLUSTRATIVE EMBODIMENTS

Figure 1:
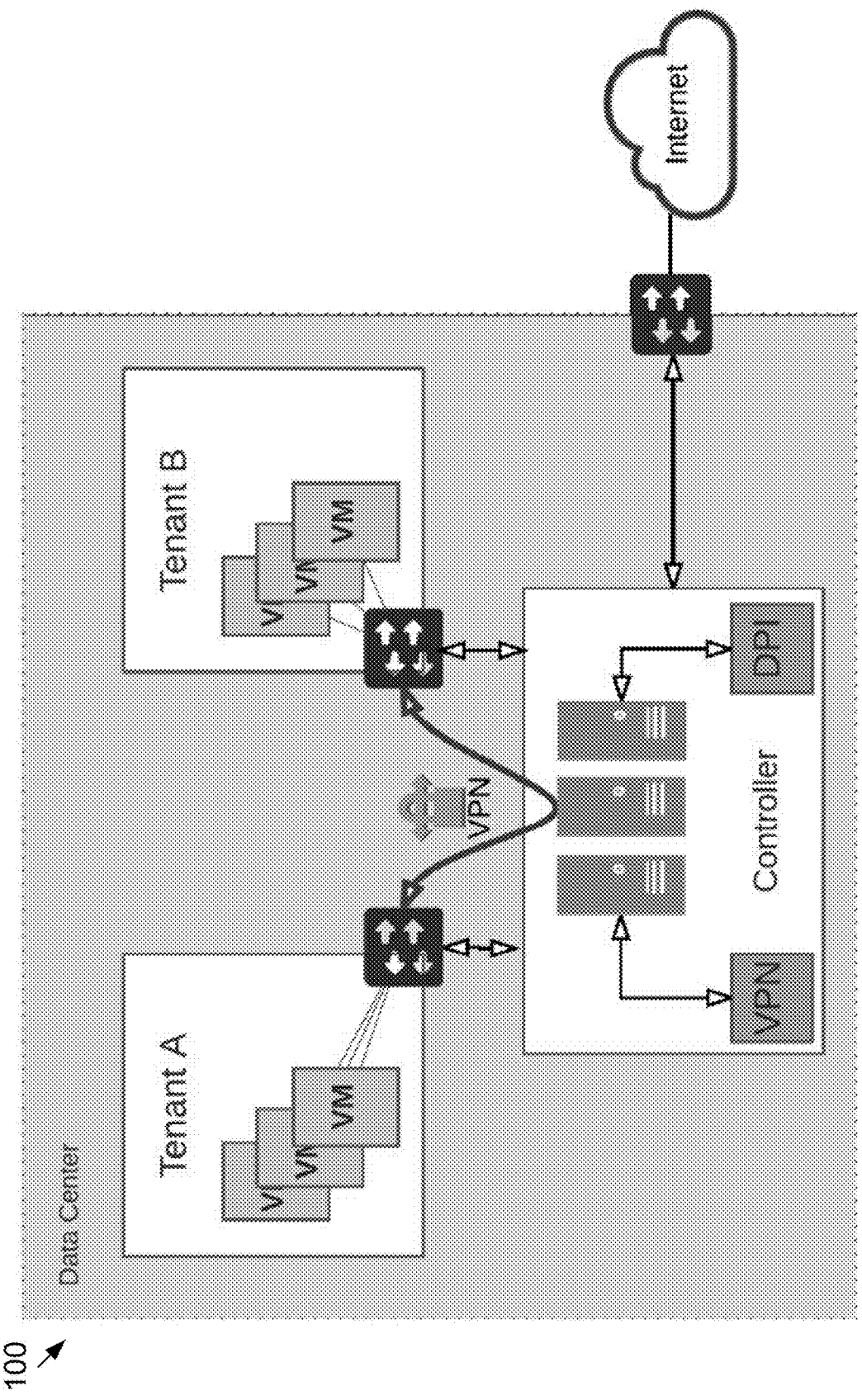
FIG. 1 depicts an illustration of various policy conflicts caused by different applications of an SDN-based cloud.

The embodiments described classify potential conflicts in an SDN-based cloud environment and including cross-layer conflicts. A methodology and system implements a controller-based algorithm for extracting flow rules in a distributed controller environment, and detects intra- and inter-table flow rule conflicts utilizing cross-layer conflict checking. Further, automatic and assisted conflict resolution mechanisms are described and a novel visualization scheme for conflict representation is presented.

Moreover, in a multi-tenant cloud environment, there is a possibility that not all parties would play fair, with some attempting to prioritize their security policy—a problem the present framework effectively addresses. To summarize, the embodiments described herein classify, detect and resolve flow rule conflicts in an SDN based distributed cloud environment including cross-layer policy conflicts. Correctness was verified on a test network with 100 rules in its flow table and scalability was tested on the Stanford backbone rule set, extrapolated up to 100,000 rules. The performance impact of running the module on the controller was also evaluated, and found to be within an acceptable 5% overhead.

The system described herein is implemented in a security policy analysis framework named Brew, built on an OpenDaylight (ODL) based SDN controller. The Brew framework effectively scrubs the flow table in a distributed SDN-based cloud environment and highlights and resolves potential conflicts. Brew includes techniques for global prioritization of flow rules in a decentralized environment depending on the decentralization strategy. Brew extends firewall rule conflict classification in a traditional environment to SDN flow rule conflicts by identifying cross-layer conflicts that tend to be temporal in nature. Brew detects flow rule conflicts in a multiple, decentralized controller based SDN-based cloud environments including conflicts between flow rules implementing QoS requirements. Brew provides strategies for unassisted resolution of these conflicts. Brew presents a novel visualization scheme that is implemented to help the administrators view flow rule conflicts graphically.

One of the major benefits of using SDN to implement a cloud environment is the ability to have multiple applications run on the SDN controller, each of which has complete knowledge of the cloud environment. This can be leveraged by the cloud provider to provide Security-as-a-Service (SaaS). A few potential examples of services in a SaaS suite are Firewalls, VPN, IDS, IPS, and MTD. Implementing a management system that only specifies security policies without tackling topological interaction amongst constituent members has always been a recipe for conflicts. With the SDN controller having visibility into the entire system topology along with the policies being implemented, several of the conflict causing scenarios in traditional networks are handled. However, there are several instances where conflicts can creep into the flow table such as policy inconsistencies caused by: a) service chain processing where multiple flow tables that handle the same flow might have conflicting actions; b) VPN implementations that modify header content could result in flow rules being inadvertently being applied to a certain flow; c) flow rule injection by different modules (using the northbound API provided by the controller) could have conflicting actions for the same flow; d) matching on different OSI layer addresses resulting in different actions; and e) administrator error. This list, while incomplete, shows how prevalent policy conflicts in SDN-based cloud environments can be. Two distinct case studies in an SDN-based cloud environment were conducted where the security of the environment as a whole was put at risk due to flow rule conflicts. The first scenario illustrates a situation where rules from different applications conflict with each other, and the second scenario illustrates a situation where rules from a single module might cause conflicts due to the dynamism in the environment.

Case Study 1: VPN Services—

In a multi-tenant hosted data center 100 (shown in FIG. 1), the provider could have layer-3 rules in place to prevent certain tenants from sending traffic to one another for monetization, compliance or regulatory reasons. As shown in FIG. 1, hosts in two different tenant environments (e.g., Tenant A and Tenant B) can establish a layer-2 tunnel (either as a host-to-host tunnel or a site-to-site tunnel) between themselves to do single hop computation or to encrypt communication between them. If an application on a different controller inserts policies to implement DPI on all packets exiting Tenant A, all traffic from Tenant A to Tenant B can be dropped, since they are encrypted and fail the DPI standards. Clearly there is an inherent conflict between flow rules inserted by different modules that are running on the SDN controller, leading to a shoddy user experience. Given such a scenario, the present system can detect and determine the flow rule conflicts and help resolve them so as to keep the flow table manageable and up-to-date.

Case Study 2: Moving Target Defense (MTD)—

Figure 2:
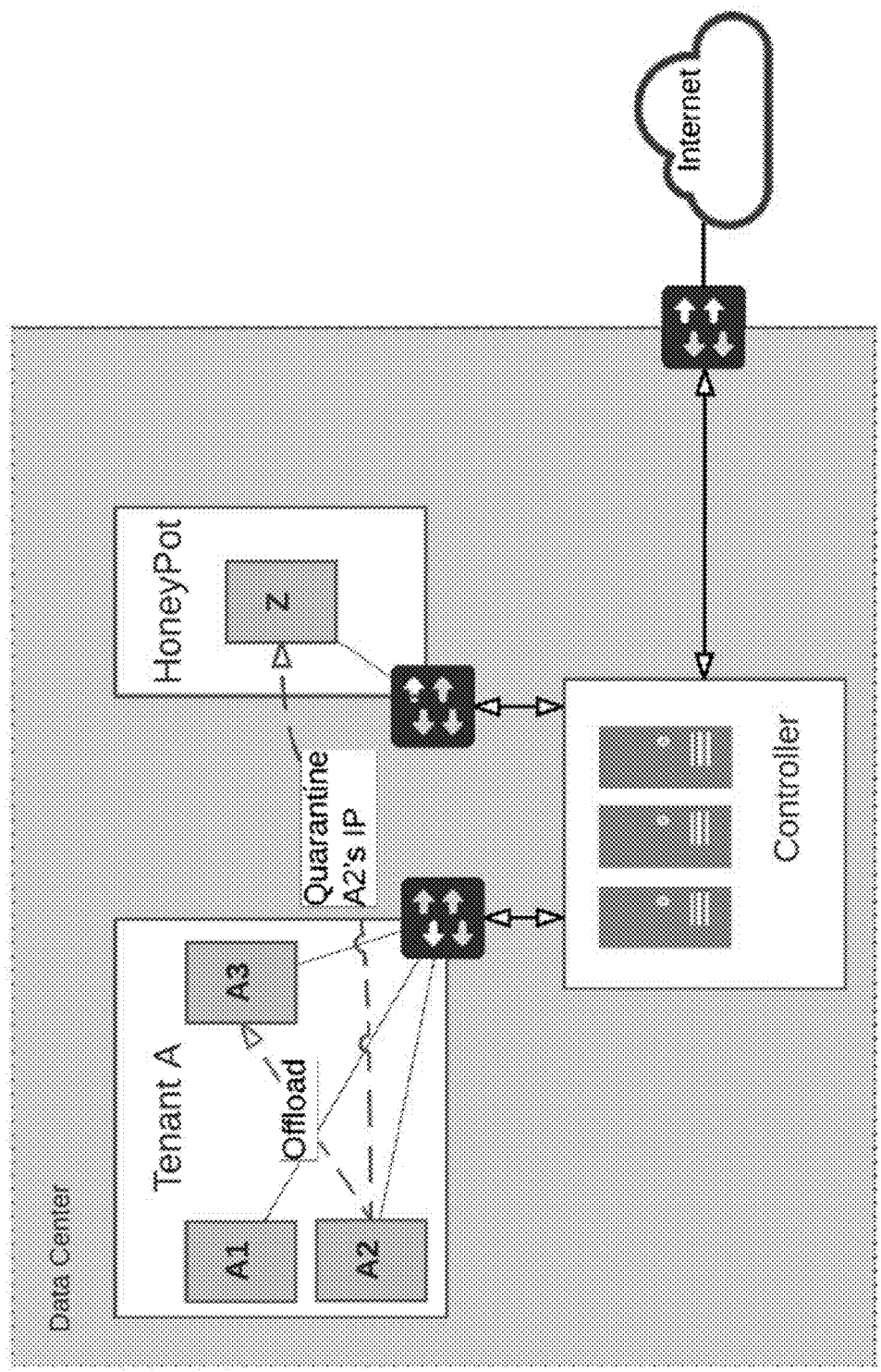
FIG. 2 depicts an illustration of various policy conflicts in an SDN-based cloud caused by Moving Target Defense (MTD).

MTD techniques have been devised as a tactic wherein security of a cloud environment is enhanced by having a rapidly evolving system with a variable attack surface, thereby giving defenders an inherent information advantage. An effective countermeasure used in MTD is network address switching, which can be accomplished in SDN with great ease. Since an MTD application could dynamically and rapidly inject new flow rules into an environment, it could lead to the problems discussed above. In the data center network 200 shown in FIG. 2, Tenant A hosts a web farm. Being security conscious, only traffic on TCP port 443 is allowed into the IP addresses that belong to the web servers. When an attack directed against host A2 has been detected, the MTD application responds with countermeasures and takes two actions: 1) a new webserver (host A3) is spawned to handle the load of host A2; and 2) the IP for host A2 is migrated to the HoneyPot network and assigned to host Z. In order to run forensics, isolate and incapacitate the attacker, the HoneyPot network permits all inbound traffic, but no traffic outward to other sections of the data center.

These actions can result in new flow rules being injected into the flow table that a) permit all traffic inbound to the IP that originally belonged to host A2 but now belongs to host Z; b) modify an incoming packet's destination address from host A2 to host A3 if the source is considered to be a non-adversarial source; c) stop all outbound traffic from the IP that originally belonged to host A2 but now belongs to host Z to the rest of the data center; and d) permit traffic on port 443 to host A3. The original policy allowing only port 443 to the IP of host A2, and the new policy allowing all traffic to the IP address of host Z are now in conflict. Effective policy checking can be used in SDN-based MTD solutions in cloud deployments.

Exemplary Flow Rule Model

In order to formally create a model that describes flow rules in an SDN-based cloud environment, an address n can first be defined as follows:

Definition 1.

An address n is a 6-tuple representing the address space $(\in_s, \in_d, \zeta_s, \zeta_d, \eta_s, \eta_d)$, where $\in$ represents the OSI layer-2, $\zeta$ represents layer-3, and $\eta$ represents layer-4 addresses; with subscript s denoting source and d denoting destination addresses.

If N can be the entire range of addresses in the 6-tuple address space, then there can be the following:

Definition 2.

A flow rule r is a transform function $f: N \rightarrow N$ that transforms n to n', where n' is $(\in'_s, \in'_d, \zeta'_s, \zeta'_d, \eta'_s, \eta'_d)$ together with an associated action set a. Thus, $$r := f(n) \rightsquigarrow a$$

Definition 3.

An action set a is the set of all associated actions taken by the controller on a flow match. Atomic actions include: a) forwarding to specific ports on the switch; b) flooding the packet on all ports; c) changing QoS; d) encapsulating; e) encrypting; f) rate limiting; g) drop the packet; and h) customizable actions using various set-field actions.

The set-field capabilities in the action fields of the rules ensures that any, all or none of the fields in n may be modified as a result of the transform function r. Considering cases where the action set a is a pointer to a different flow table, the transform function on the result of the original transform function n' can be applied. Formally, if $r := f(n) \rightsquigarrow a$; $f(n) = n'$ and $a := g(n) \rightsquigarrow a'$ then, $r := g(f(n)) \rightsquigarrow a'$.

Thus, multiple rules applied in succession to the same input address space can simply be modeled as a composite function. It must be noted that the complexity of the flow rule composition function would be exponential in nature, since each flow rule could have multiple actions, each of which themselves could recursively lead to multiple atomic actions.

In a flow table R containing rule set $\{r_1, r_2, \ldots, r_n\}$, with each flow rule $r_i \in R$ being a 6-tuple $(p_i, \alpha_i, \nu_i, \rho_i, a_i)$, there can be: a) p as the priority of the rule defined in the range [1; 65535]; b) $\alpha$ is the ingress port; c) $\nu$ is a VLAN ID; d) n is the 6-tuple address space defined earlier; e) $\rho$ as the layer-4 protocol; and f) a as the action set for the rule. Flow rules also contain packet counters and timeout values, but they are not relevant match or action fields in rule processing. Match fields $\alpha$ and $\nu$, representing ingress port and VLAN ID merely eliminate and do not add to potential conflicts and are not included in further discussion. Of these fields, just priority, match fields and instructions are the focus to build the flow rule conflict problem. TABLE 1, shown below, shows sample flow table rules.

TABLE 1

Flow table example.

| Rule # | Priority | Source MAC | Dest MAC | Source IP | Dest IP | Protocol | Source Port | Dest Port | Action |
|---|---|---|---|---|---|---|---|---|---|
| 1 | 51 | * | * | 10.5.50.0/24 | 10.211.1.63 | tcp | * | * | permit |
| 2 | 50 | * | * | 10.5.50.5 | 10.211.1.63 | tcp | * | 80 | permit |
| 3 | 52 | * | * | 10.5.50.5 | 10.211.1.0/24 | tcp | * | * | permit |
| 4 | 53 | * | * | 10.5.50.0/24 | 10.211.1.63 | tcp | * | * | deny |
| 5 | 54 | * | * | 10.5.50.5 | 10.211.1.63 | tcp | * | * | deny |
| 6 | 51 | * | * | 10.5.50.0/16 | 10.211.1.63 | tcp | * | * | deny |
| 7 | 55 | * | * | 10.5.50.5 | 10.211.1.0/24 | tcp | * | 80-90 | deny |
| 8 | 57 | 11:11:11:11:11:ab | 11:11:aa:aa:11:11 | * | * | * | * | * | permit |
| 9 | 58 | * | * | * | * | tcp | * | 80 | deny |

Flow Rule Management Challenges

Switches in an SDN-based cloud environment can maintain at least one flow table, consisting of match conditions and associated actions. An ingress packet can be matched against the flow table entries to select the entry that best matches the ingress packet, and the associated instruction set is executed. Such an instruction may explicitly direct the packet to another flow table, where the same process is repeated again. When processing stops, the packet is processed with its associated action set.

Since flow rules have the ability to match more than just layer-3 and layer-4 headers as in a traditional network, they are inherently more complex by virtue of having additional variables to consider for a match. The actions that can be applied on a match include forwarding to specific ports on the switch, flooding the packet, changing its QoS levels, dropping the packet, encapsulating, encrypting, rate limiting or even customizable actions using various set-field actions. Since cross-layer interaction is bolstered in SDN by virtue of having flow rules that permit set-field actions, several packet headers can be dynamically changed. Lastly, since wildcard rules are allowed, a partial conflict of a flow policy could occur, thereby adding complexity to the resolution of conflicting flow rules. As opposed to a traditional network, flow rules in SDN can have the same priorities as well as matches on multiple header fields, thereby resulting in indirect dependencies. For example, referring to network topology 300 in FIG. 3, consider traffic originating from host A des-tined to host C. This flow would clearly match rule 8 in Table 1 based off a layer-2 address match, and rule 1 based off a layer-3 address match. A flawed approach to tackle this problem would be to expand the header space and determine rule conflicts as in a traditional environment since there exists an indirect dependency between the layer-2 and layer-3 addresses. Moreover, flow rules could exist that do not include all the header fields making an apples-to-apples comparison impossible. The embodiments described here take a different approach to detecting and solving indirect conflicts. Since these conflicts arise as a result of addressing across different OSI layers, they are categorized differently. Security implementations using SDN leverage the ability to make dynamic changes to the network and system configurations to have a lean, agile and secure environment. Since this usually results in environments that are constantly in flux, any kind of a security infrastructure has to detect these changes in real time, and update flow rules on the distributed controllers to keep it in line with the security policy of the organization.

Flow Rule Conflict Classification

The set operations on address spaces can be formally defined as follows. Let $\xi$ be a 2-tuple address space $(\xi_s; \xi_d)$, with subscript s denoting the source address set and d denoting the destination address set. Then the following definitions can apply:

Definition 4.

An address space $\xi_i \subseteq \xi_j$ if an only if they refer to the same OSI layer, and $\xi_{si} \subseteq \xi_{sj} \wedge \xi_{di} \subseteq \xi_{dj}$.

Definition 5.

An address space $\xi_i \not\subseteq \xi_j$ if and only if they refer to the same OSI layer, and $\xi_{is} \not\subseteq \xi_{sj} \vee \xi_{di} \not\subseteq \xi_{dj}$.

Definition 6.

An address space $\xi_i \subset \xi_j$ if and only if they refer to the same OSI layer, and $(\xi_{si} \subset \xi_{sj} \wedge \xi_{di} \subseteq \xi_{dj}) \vee (\xi_{si} \subseteq \xi_{sj} \wedge \xi_{di} \subset \xi_{dj})$.

Definition 7.

Address space intersection $\xi_i \cap \xi_j$ produces a tuple $(\xi_{si} \cap \xi_{sj}, \xi_{di} \cap \xi_{dj})$ if and only if $\xi_i$ and $\xi_j$ refer to the same OSI layer.

Definition 8.

Conflict detection problem seeks to find rules $r_i$, $r_j$ such that $r_i, r_j \in R$ and $(n_i \cap n_j \neq \emptyset) \wedge (\rho_i = \rho_j) \wedge (a_i \neq a_j \vee p_i \neq p_j)$.

Since flow rules in an SDN-based cloud environment are clearly a super-set of rules in a traditional firewall environment, work on flow rule conflicts is an extension of the work on firewall rule conflicts. Several works have been used to classify firewall rule conflicts in a single firewall environment. However, the embodiments described herein introduce a new classification of conflicts that better describes conflicts between address space overlap over multiple OSI layers.

Figure 4:
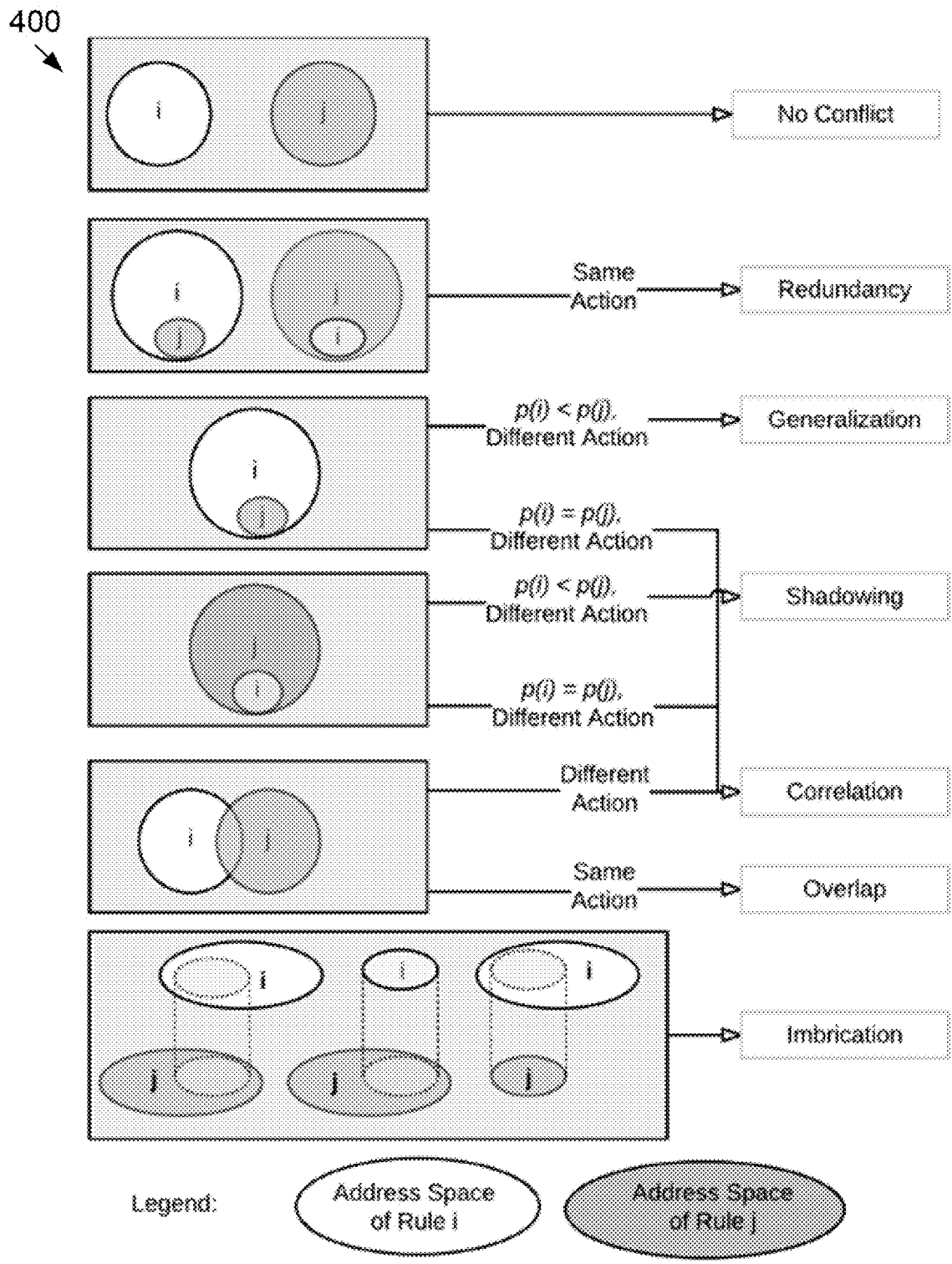
FIG. 4 depicts Venn diagrams showing address space overlap and flow rule conflicts according to an embodiment of the present disclosure.

FIG. 4 depicts Venn diagrams 400 showing address space overlap and flow rule conflicts according to an embodiment of the present disclosure. Knowing that OpenFlow specifications clarify that if a packet matches two flow rules, only the flow rule with the highest priority is invoked, conflicts in SDN flow rules (shown in FIG. 4) can be classified into:

Redundancy:

A ruler $r_i$ is redundant to rule $r_j$ if a) address space $\in_i \subseteq \in_j \wedge \zeta_i \subseteq \zeta_j \wedge \eta_i \subseteq \eta_j$) protocol $p_i = p_j$; and c) action $a_i = a_j$. For example, rule 2 in Table 1 has an address space that is a subset to the address space of rule 1, with matching protocol and actions. Hence, rule 2 is redundant to rule 1. Redundancy is more of an optimization and efficiency problem.

Shadowing:

A ruler $r_i$ is shadowed by rule $r_j$ if a) priority $p_i < p_j$; b) address space $\in_i \subseteq \in_j \wedge \zeta_i \subseteq \zeta_j \wedge \eta_i \subseteq \eta_j$; c) protocol $p_i = p_j$; and d) action $a_i \neq a_j$. In such a situation, rule $r_i$ is never invoked since incoming packets always get processed using rule $r_j$, given its higher priority. Shadowing is a potentially serious issue since it shows a conflicted security policy implementation. For example, rule 4 in Table 1 has the same address space as rule 1, with the same protocol, but conflicting actions. Hence, rule 1 is shadowed by rule 4.

Generalization:

A rule $r_i$ is a generalization of rule $r_j$ if a) priority $p_i < p_j$; b) address space $(\in_i \supset \in_j \wedge \zeta_i \supseteq \zeta_j \wedge \eta_i \supseteq \eta_j) \vee (\in_i \supseteq \in_j \wedge \zeta_i \supset \eta_j) \vee (\in_i \supseteq \wedge \zeta_i \supseteq \zeta_j \wedge \eta_i \supset \eta_j)$; c) protocol=$p_i$=$p_j$; and d) action $a_i \neq a_j$. In this case, the entire address space of rule $r_j$ is matched by rule $r_i$. As shown in Table 1, rule 1 is a generalization of rule 5, since the address space of rule 5 is a subset of the address space of rule 1, and the actions are different. Note, that if the priorities of the rules are swapped, it will result in a shadowing conflict.

Correlation:

Classically, a rule $r_i$ is correlated to rule $r_j$ if a) address space $\in_i \not\subseteq \in_j \wedge \zeta_i \not\subseteq \zeta_j \wedge \eta_i \not\subseteq \eta_j \wedge \in_i \not\supseteq \in_j \wedge \zeta_i \not\supseteq \zeta_j \wedge \eta_i \not\supseteq \eta_j \wedge (\in \cap \in_j \neq \emptyset \wedge \zeta_i \cap \zeta_j \neq \emptyset \wedge \eta_i \cap \eta_j \neq \emptyset$; b) protocol $p_i = p_j$; and c) action $a_i \neq a_j$. As shown in Table 1, rule 3 is correlated to rule 4. Since multiple SDN flow rules can have the same priority, the following condition also leads to a correlation conflict: a) priority $p_i = p_j$; b) address space $\in_i \cap \in_j \neq \emptyset \vee \zeta_i \cap \zeta_j \neq \emptyset \vee \eta_i \cap \eta_j \neq \emptyset$; c) protocol $p_i = p_j$; and d) action $a_i \neq a_j$. Thus, the correlation conflict now encompasses all policies that have the different actions, overlapping address spaces and the same priority. For example, in Table 1, rule 6 is correlated to rule 1.

Overlap:

A rule $r_i$ overlaps rule $r_j$ if a) address space $\in_i \not\subseteq \in_j \wedge \zeta_i \not\subseteq \zeta_j \wedge \eta_i \not\subseteq \eta_j \wedge \in_i \not\supseteq \in_j \wedge \zeta_i \not\supseteq \zeta_j \wedge \eta_i \not\supseteq \eta_j \wedge (\in_i \cap \in_j \neq \emptyset \vee \zeta_i \cap \zeta_j \neq \emptyset \vee \eta_i \cap \eta_j \neq \emptyset$; b) protocol $p_i = p_j$; and c) action $a_i = a_j$. An overlap rule is the complementary conflict to a correlation; but with the flow rules in question having matching action sets instead of opposing actions. The overlap can be seen between rule 6 and rule 7 in Table 1.

Imbrication: Flow rules where not all OSI addresses layers have match conditions could result in cases where, a) only layer-3 header is used as a condition (rule 1-7); b) only layer-2 header is used as a condition for decision (rule 8); and c) only layer-4 header is used as a condition (rule 9). Address space overlaps between rules are classified as imbrication. Imbrication conflicts are more complex than the other conflict classifications, since they are temporal in nature. For example, the mapping between a layer-2 MAC address and layer-3 IP addresses might result in a conflict between two flow rules at time $t_1$ in the layer-3 address space. But, if the IP-MAC address mapping changes, there may not be an address space overlap between the two rules at the $t_2$. This makes imbrication conflicts hard to find and resolve. Using the topology shown in FIG. 3 and the flow rules in TABLE 1, it can be seen that flow rule 4, which denies traffic from host A to host C and flow rule 8, which permits traffic from host A to host C are clearly imbricates.

Controller Decentralization Model

Centralizing the control plane in SDN is fraught with scalability challenges associated with the SDN controller being a bottleneck. While benchmarking tests on an SDN indicate that successful processing of about 30,000 requests per second, it does not scale well enough to be deployed in a cloud environment. Distributing the controller responsibilities to multiple devices is an obvious solution. Choosing a decentralized control architecture is not trivial. There are several controller placement solutions and factors such as the number of controllers, their location, and communication topology impact network performance. Three major issues need to be addressed in determining the decentralization architecture: 1) efficient eastbound and westbound APIs need to be developed for communication between SDN controllers; 2) the latency increase introduced due to network information exchange between the controllers needs to be kept to a minimum; and 3) the size and operation of the controller back-end database needs to be evaluated. Since the key piece of information required for accurate flow rule conflict detection and resolution is the priority value p, the key challenge in extending flow rule conflict resolution from a single controller to a distributed SDN-based cloud environment lies in associating global priority values to flow rules. The strategies to associate these global priority numbers to flow rules in different decentralization scenarios differ drastically. Four different multiple controller scenarios are herein described along with the global priority assignment logic and a corresponding framework for each scenario.

1. Host Partitioning

This partitioning method is most similar to a traditional layered network architecture, where an SDN controller handles the functionalities of an access level switch, combined with the intelligence of a router and access control server. The SDN-based cloud environment is separated into domains, where each domain is controlled by a single controller. The controllers then communicate with each other using east-west communication APIs. Running on the assumption that the controller knows best about the nodes it is responsible for, flow rules which contain match conditions with addresses local to the controller are preferred. Flow rule conflict resolution in this scenario doesn't need to take into account every flow rule in the environment, but only ones for the local domain. While host partitioning is the most intuitive decentralization strategy, it eliminates some of the flexibility provided by the network topology dynamicity in SDN.

2. Hierarchical Controllers

Hierarchical controller architecture is a variant of host partitioning. The difference lies in assigning the priority of the flow rules. Instead of the local flow rules having the highest priority, in a hierarchical controller architecture, the local (or leaf) controllers have the lowest priority. Moreover, the partitioning is not strictly host based, as administrators could decide to run certain applications at a leaf level, and certain applications at higher level controllers. For example, a Dynamic Host Configuration Protocol (DHCP) application could reside on the leaf controller; while a NAT application could reside on the root controller. In case of conflicts, the flow rules originating from applications on the root controller are preferred.

3. Application Partitioning

For a multiple SDN controller environment where each controller handles specific applications or application groups, associating a priority values is straightforward. By assigning a weight to each application, the global priorities of flow rules generated by all applications can be determined. For example, consider Controller A has security applications running on it and Controller B has QoS and traffic shaping applications running on it. If security applications are prioritized with a higher weight than traffic shaping applications, two flow rules with the same priority generated by applications on Controller A and Controller B will end up with the rule generated by Controller B having a lower global priority. An alternate strategy to assign global priority values would be to allocate ranges for flow rules created by applications. For example, it could be decided that any NAT rule generated by the NAT application on the controller has to be within a priority of 40,000 and 42,000. Thus a global priority for a NAT rule would be generated by mapping the priority originally in the range [1; 65535] to a global priority in the range [40000; 42000].

4. Heterogeneous Partitioning

In heterogeneous decentralized environment, appealing aspects of each of the above decentralization scenarios are combined to obtain the optimal situation for meeting the requirements. Careful consideration needs to be taken to identify the priorities of applications and controllers before deployment, so as to have a conflict resolution strategy. Alternately, the conflict resolution could be reverted to a manual process where administrators provide the conflict resolution decision.

Conflict Resolution Model

1. Intelligible Conflicts

Flow rules that conflict with each other in the Redundancy, Shadowing and Overlap classifications all have the same action and can be resolved without the loss of any information. In other words, any packet that is permitted by the controller prior to resolving the conflict will continue to be permitted after conflict resolution. Intelligible conflicts are resolved fairly easily by eliminating the rules that are not applied, or by combining and optimizing the address spaces in the rules so as to avoid the conflict. It could be argued that creative design of rules by administrators result in flow rules that deliberately conflict so as to optimize the number of rules in the flow table, especially when it comes to traffic shaping policies. However, such optimization strategies stem out of legacy network management techniques, and do not hold true in dynamic, large-scale cloud environments where the flow table enforcing the policies in the environment could have millions of rules.

2. Interpretive Conflicts

Conflicts that fall into Generalization, Correlation and Imbrication classifications cannot be intuitively resolved without any loss of information, and are interpretative in nature. As opposed to intelligible conflicts, it is not guaranteed that any packet permitted by the controller prior to resolving the conflict will be permitted after conflict resolution. Since interpretative conflict resolution is lossy in nature, the resolution strategies are not one-size-fits-all and need to be adapted according to the cloud environment in question. Re-moving these conflicts is a complex problem. Described below are a few resolution strategies that could be applied to resolving these conflicts.

Least privilege—In case of any conflict, flow rules that have a deny action are prioritized over a QoS or a forward action. If conflicts exist between a higher and lower bandwidth QoS policy, the lower QoS policy is enforced. The least privilege strategy is traditionally the most popular strategies in conflict resolution.

Module security precedence—Since flow rules in an SDN-based cloud environment can be generated by any number of modules that run on the controller, an effective strategy that can be put in place is to have a security precedence for the origin of the flow rule. Thus, a flow rule originating from a security module is prioritized over flow rule from an application or optimization module. The weighted global priorities are calculated as discussed in the application-based partitioning scheme discussed above. TABLE 2 below shows sample precedence and associated global priority weight values for a few generic applications that might run in an SDN-based cloud.

TABLE 2

Security Precedence Priority Multiplier Example.

| Application | Precedence | Global Priority Weight |
| --- | --- | --- |
| Virtual Private Network | 1 | 3 |
| Deep Packet Inspection | 2 | 2.5 |

TABLE 2-continued

Security Precedence Priority Multiplier Example.

| Application | Precedence | Global Priority Weight |
| --- | --- | --- |
| Network Address Translation | 3 | 2 |
| Quality of Service | 4 | 1.5 |
| Domain Name Service | 5 | 1 |

Environment calibrated—This strategy incorporates learning strategies in the environment to make an educated decision on which conflicting flow rule really needs to be prioritized. Over time, if a picture can be formed about the type of data that a certain tenant usually creates/retrieves, or of the applications and vulnerabilities that exist in the tenant environment, or of the reliability of the software modules inserting the flow rule; the conflict resolution module may be able to prioritize certain flow rules over others. However, these techniques falter while dealing with a dynamic cloud. An alternate environment calibrated approach might involve quantitative security analysis of the environment with each of the conflicting rules, and picking the safest option.

Administrator assistance—Administrators that are willing to give up automatic conflict resolution have the option to be able to resolve conflicts themselves. Visual assistance tools incorporated as part of the Brew framework can assist the administrator make a decision.

Exemplary System Modules

Figure 5:
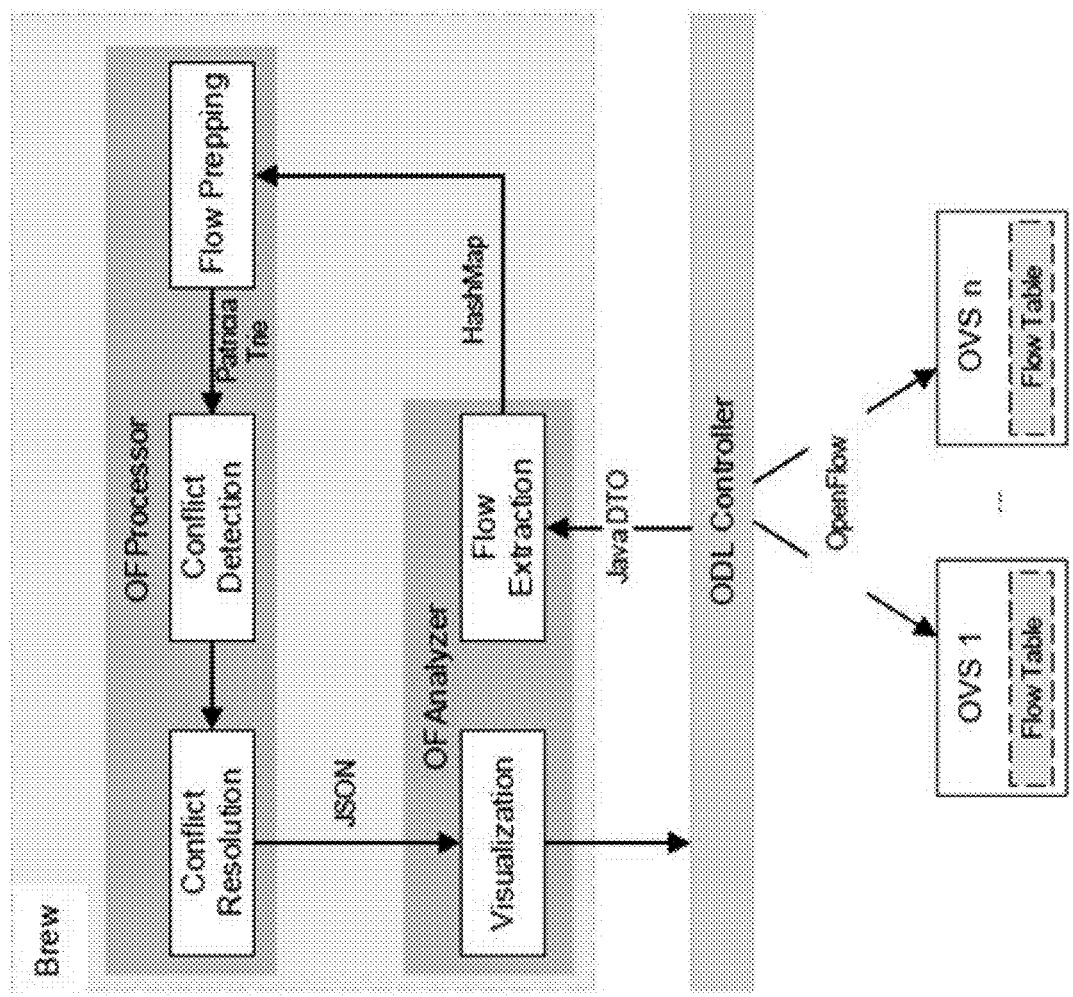
FIG. 5 depicts a system overview representing various Brew framework modules according to an embodiment of the present disclosure.

An embodiment of the Brew framework 500, as shown in FIG. 5, is an intuitive model use to help resolve conflicts in flow rules in a distributed SDN-based cloud environment. It consists of two inter-related modules, OFAnalyzer and OFProcessor that together achieve a conflict free flow table. These modules all operate at the control plane level, i.e. their operations are uninhibited by either the physical topology or the logical topology as seen by the different tenants. Brew runs as an application on the controller that listens for new/modified flow rules being introduced into the system as part of the OFAnalyzer module. The processing is broadly compartmentalized to sanitization, conflict detection and conflict resolution, as part of the OFProcessor module. The modules that accomplish these tasks are detailed below.

1. Flow Extraction Engine

The flow extraction engine functions as part of the OFAnalyzer module in Brew. It intercepts any new or updated flow rule that is being injected into the controller from different modules. These rules, which can be called candidate flow rules, can be generated by any module running on the controller or by the administrator. A candidate flow rule is not completely processed and vetted, and hence is not eligible to be sent to any of the devices. In a distributed controller scenario, candidate flow rules into every controller is obtained, in an effort to have complete knowledge of all possible flow rules that are present in the environment. The priority of the rules from the controller are modified to a global priority, based on the decentralization strategy that has been employed. Thus, the priority assigned by the flow extraction engine may differ from the priority of the flow rule present in the flow table. In a redundant controller setup, only candidate rules from the master controller are obtained, and in a truly distributed environment, candidate flow rules are aggregated from all the controllers before processing.

Figure 6:
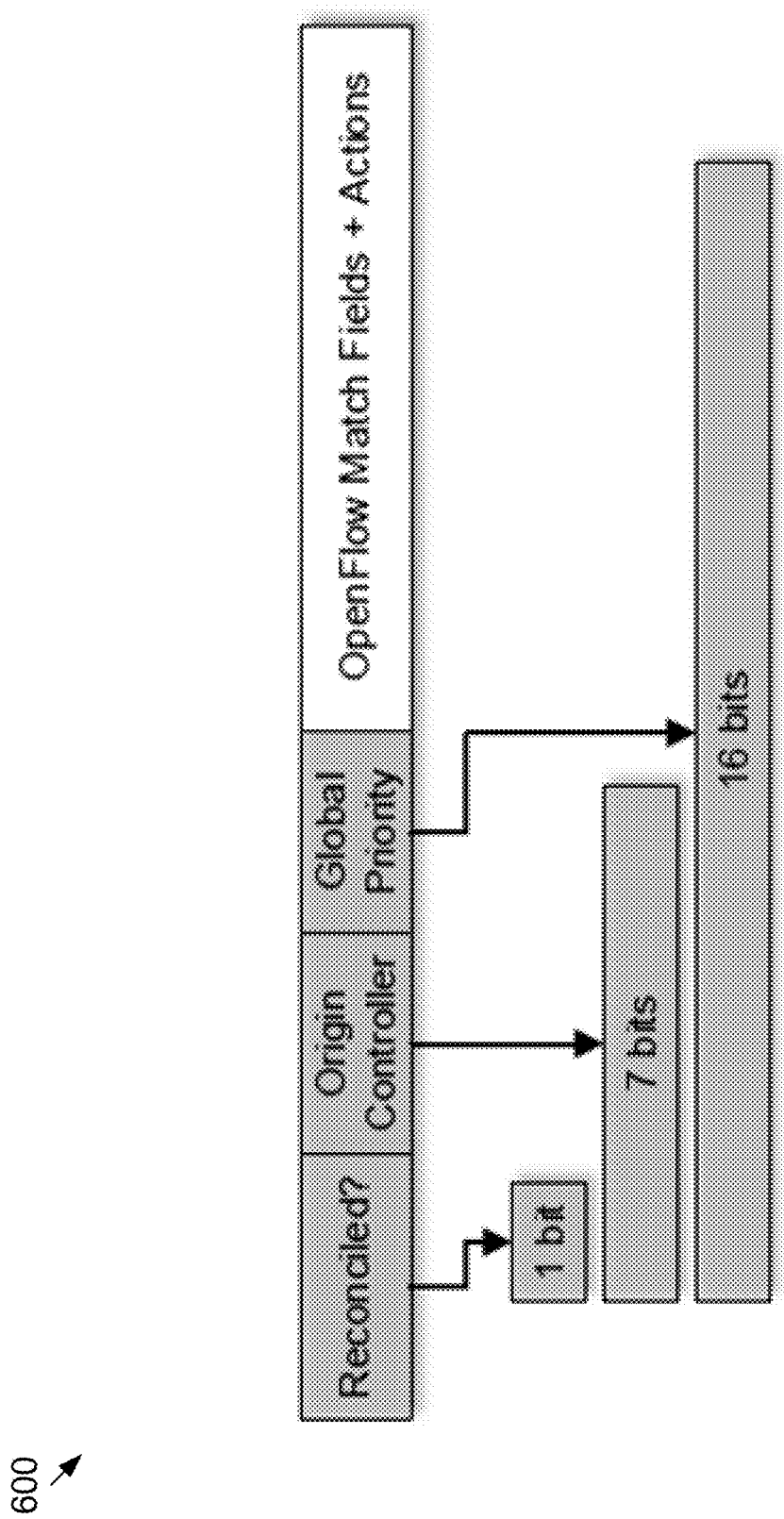
FIG. 6 depicts a data structure format according to an embodiment of the present disclosure.

The default OpenFlow rule specifications do not provide us all the information needed to detect and resolve flow rule conflicts. Thus, a data structure 600 can be added to accompany the extracted OpenFlow rule using three additional fields over 32 bits of information as shown in FIG. 6. These fields are: a) one bit identifying if the rule in question has been tagged as a reconciled rule (required for imbricate detection); b) seven bits identifying the SDN controller to which the rule is going to be inserted; and c) sixteen bits for a global priority of the flow rule (to be used for flow rule conflict resolution). Armed with these additional bits of information, detection of flow rule conflicts using the methodology shown in Algorithm 1 below is now possible.

2. Flow Prepping Engine

The flow prepping engine functions as part of the OFProcessor module in Brew. Since OpenFlow permits chained flow rules by having an action for a match redirect to a different flow table, in order to correctly identify conflicts between flow rules, the flow rules can be atomized by processing the chains and ensuring that only the atomic actions of permit, deny and QoS remain. The atomization process itself follows along the lines of ipchain processing in Unix with modifications based on the formal model described previously. Since QoS and packet counters can be processed along with the permit and deny actions, flow rules with QoS and traffic engineering actions are not processed any further. Two important considerations are discussed below.

While the actions for a flow rule can include any drop, forward, flood, set QoS parameters, change several header fields, or redirect to a different flow table; the actions can be processed and generically classified into two categories: permit and deny. For example, implementing an IP mapping rule in OpenFlow would change the IP address headers and forward onto a different flow table that forwards the traffic. In the described embodiments, such a chain is processed to include the address translation information and set the final atomic action to be permit. For rules which have multiple actions, the rules can be duplicated to generate rules with identical priority and match conditions with a single action.

Flow rules which have only layer-2 address spaces in its match conditions are next mapped to their layer-3 addresses using a process called reconciliation. The mapping information is obtained using a temporal 1-to-1 mapping by doing a table lookup. In cases where a mapping is found, the rule is tagged to indicate a reconciled address and to identify flow rules which fall into the imbrication conflict. In cases where a mapping is found, the rule is tagged to indicate a reconciled address to identify flow rules which fall into the imbrication conflict. Rules that have only layer-4 match conditions are also tagged as such.

3. Conflict Detection Engine

The conflict detection engine functions as part of the OFProcessor module in Brew. Once the flows present in the system has been extracted and processed, the conflict detection engine identifies and classifies conflicts based on the categories described previously.

Determining the existence of address space overlap between flow rules is the first step in deciding if a conflict exists between two flow rules. The address space overlap is detected using a Patricia trie lookup-based algorithm. The Patricia trie is an efficient search structure for finding matching IP strings with a good balance between running time (lookup and update) and memory space requirement, and has been used previously with great success. The present embodiments can use an octet-wise Patricia trie lookup to look for IP address range overlap between the new rules being inserted and existing rules in the flow table in a fast and efficient manner. Once an address space overlap is determined, evaluating if a conflict exists between the flow rules can be accomplished in constant time using simple comparison operations. These processes are shown in Algorithm 1 below.

```
Algorithm 1:

Input   :Rule r, FlowTable f
Output  :Conflict-free FlowTable f'
Procedure ConDet( )
1        if !r.reconciled then
2              F ← SearchPatricia(r.l3addr)
3              while Rule γ ∈ F do
4                   if r.protocol ! = γ.protocol then
5                         return AddFlow (f,r)
6                   else if r.addr ⊆ γ.addr then
7                         if r.action == γ.action then
8                               return ConRes (r,γ,f,Redundancy)
9                         else if r.priority == γ.priority then
10                              return ConRes (r,γ,f,Correlation)
11                        else if r.priority < γ.priority then
12                              return ConRes (r,γ,f,Shadowing)
13                  else if γ.addr ⊆ r.addr then
14                        if r.action == γ.action then
15                              return ConRes (r,γ,f,Redundancy)
16                        else if r.priority == γ.priority then
17                              return ConRes (r,γ,f,Correlation)
18                        else if r.priority > γ.priority then
19                              return ConRes (r,γ,f,Generalization)
20                  else if r.addr ∩ γ.addr ! = ∅ then
21                        if r.action == γ.action then
22                              return ConRes (r,γ,f,Overlap)
23                        else
24                              return ConRes (r,γ,f,Correlation)
25       else
26              while Rule γ ∈ f do
27                   if r.protocol == γ.protocol then
28                         if r.addr ∩ γ.addr ! = ∅ then
29                              return ConRes (r,γ,f,Imbrication)
30       return AddFlow (f,r)
```

4. Conflict Resolution Engine

Once the flow rule conflicts have been detected, the conflict resolution module is invoked. Intelligible conflicts are resolved automatically. However, in case of interpretative conflicts (Generalization, Correlation and Imbrication) that cannot be resolved without loss of information. The conflict resolution processes are shown in Algorithm 2.

```
Algorithm 2:

Input   :Rule r, Rule γ, FlowTable f, String ConflictType
Output  :Conflict-free FlowTable f'
Procedure ConRes( )
1        if ConflictType == Shadowing || ConflictType == Redundancy then
2              return f
3        else if ConflictType == Correlation then
4              if γ.globalPriority > r.globalPriority then
5                    r.addr ← r.addr − γ.addr
6                    f' ← AddFlow (f,r)
7              else
```

Algorithm 2:

```
 8  |         |              |         f' ← RemoveFlow (f,γ)
 9  |         |              |         γ.addr ← γ.addr − r.addr
10  |         |              |         f' ← AddFlow (f,r)
11  |         |              |_        f' ← AddFlow (f,γ)
12  |         else if ConflictType == Generalization then
13  |         |              f' ← RemoveFlow (f,γ)
14  |         |              γ.addr ← γ.addr − r.addr
15  |         |              f' ← AddFlow (f,γ)
16  |         |_             f' ← AddFlow (f,r)
17  |         else if ConflictType == Overlap then
18  |         |              r.addr ← r.addr + γ.addr
19  |         |              f' ← RemoveFlow (f,γ)
20  |         |_             f' ← AddFlow (f,r)
21  |         else if ConflictType == Imbrication then
22  |         |              if γ.globalPriority > r.globalPriority then
23  |         |              |         r.addr ← r.addr − γ.addr
24  |         |              |_        f' ← AddFlow (f,r)
25  |         |              else
26  |         |              |         f' ← RemoveFlow (f,γ)
27  |         |              |         γ.addr ← γ.addr − r.addr
28  |         |              |         f' ← AddFlow (f,r)
29  |         |_             |_        f' ← AddFlow (f,γ)
30  |_        return f'
```

Exemplary Implementation

Brew was implemented on an OpenDaylight (ODL) SDN controller. ODL is an open-source project under The Linux Foundation, and has representational state transfer (REST) APIs for use by external applications. The embodiments described herein extend the stable version (Lithium) of the ODL controller. By modularizing the functionality of Brew into the front-end OFAnalyzer interface and a back-end OFProcessor, as shown in FIG. 5, the same OFProcessor back-end can work with multiple SDN controller specific OFAnalyzer interfaces.

Figure 7:
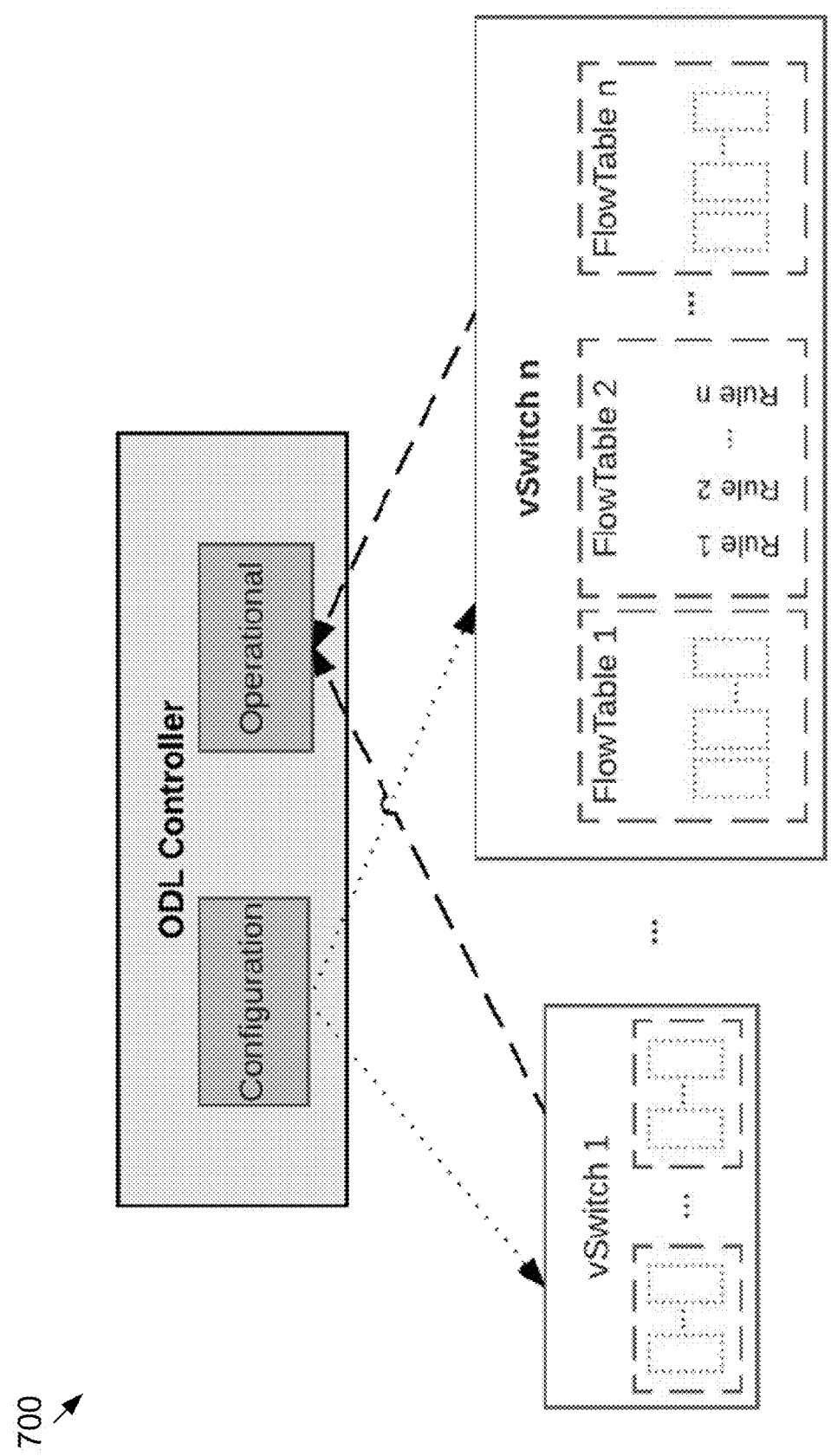
FIG. 7 depicts a diagram showing OpenDaylight (ODL) data stores used in an implementation of an embodiment of the present disclosure.

The OFAnalyzer module acts as the interface between the SDN controller and the OFProcessor back-end. It performs two important tasks: 1) flow extraction; and 2) conflict visualization. The flow extraction engine 700 in the OFAnalyzer listens and extracts flow rules from two different data stores maintained by ODL, as shown in FIG. 7. Classified broadly on the type of data maintained in them, they are: 1) configuration data store; and 2) operational data store. The configuration data store on each ODL controller contains data that describe the changes to be made to the flow rules on the switches. Candidate flow rules sent by all applications reside in this tree before they are sent to the devices. The operational data store matches the configuration data store in structure, but contains information that the controller discovers about the network through periodic queries. Listening to flow rules from both data stores helps the OFAnalyzer maintain a complete view of the flow rules present in the environment, especially in a distributed controller scenario. The source of the rules is noted so as to eliminate duplication.

The OFAnalyzer listens for changes in the flows present in the operational data store by registering itself as a listener using a DataBroker Document Object Model (DOM) tree to be informed of any addition or modification to flows. The flow rules and the associated conflict information (if any) are obtained using a REST Request. In addition, the flow extraction engine also listens for candidate flow rules from different applications running on the controllers. The results, which may be obtained as a list of JavaScript Object Notation (JSON) objects, are prepared for visualization using JavaScript conversion routines. Multiple visualization schemes then display this information to the administrator in a manner of his/her choosing. The configuration data store is handled simply by placing the OFAnalyzer as sort of a redirect for extracting candidate flow rules and piping them through the OFProcessor prior to any new flow rules being placed in the configuration data store. The required data is received using a Java Data Transfer Object (DTO). The OFAnalyzer extracts the flows from the DTOs and stores it in a local HashMap. Once the flows have been extracted, each flow is given a unique identifier, making it easier to track the flow when analyzing conflicts, and for visualization purposes. The HashMap is then passed to the OFProcessor.

Figure 8:
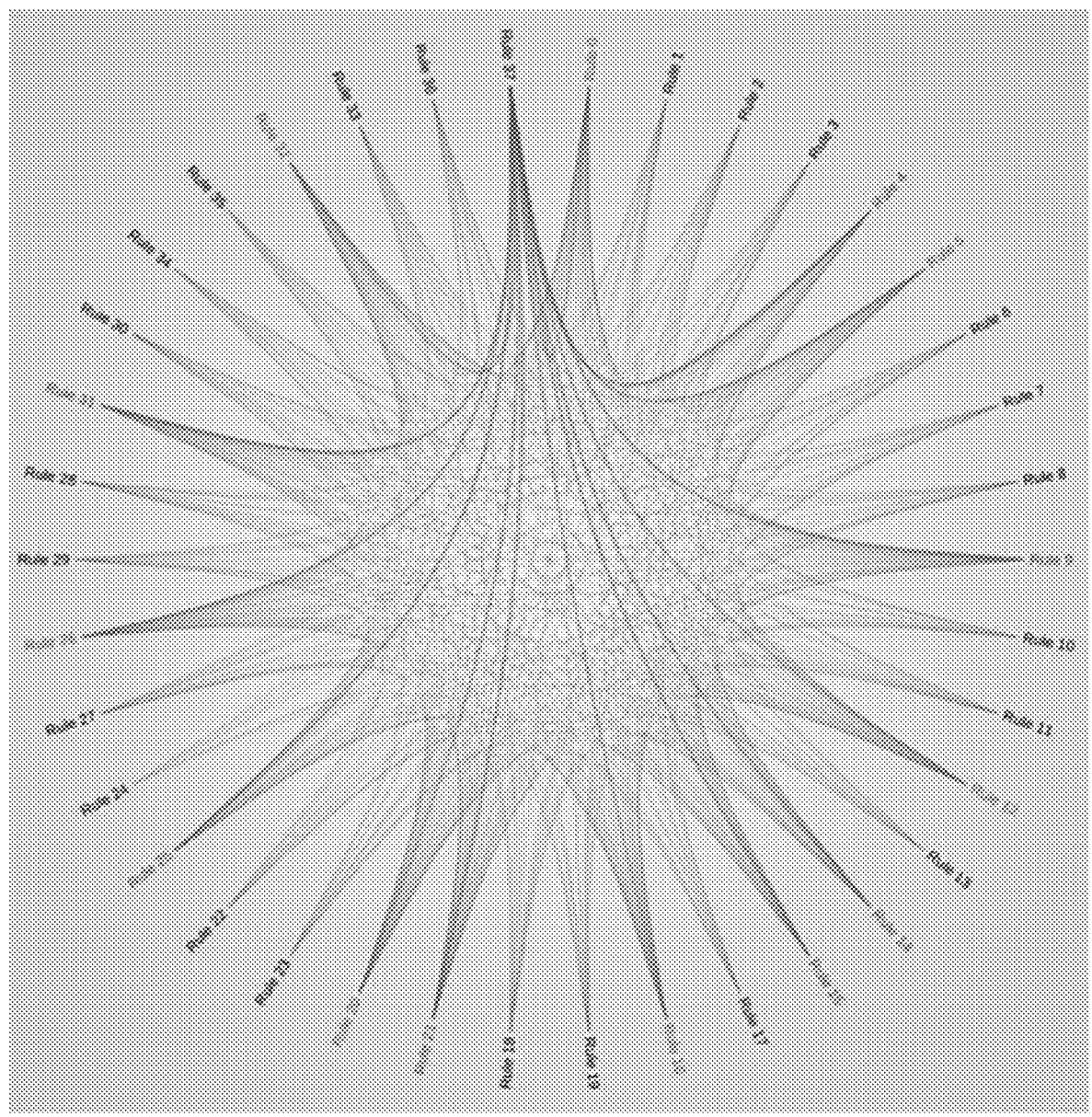
FIG. 8 depicts a hierarchical edge bundling structure showing conflicts in a flow table according to an embodiment of the present disclosure.
Figure 9:
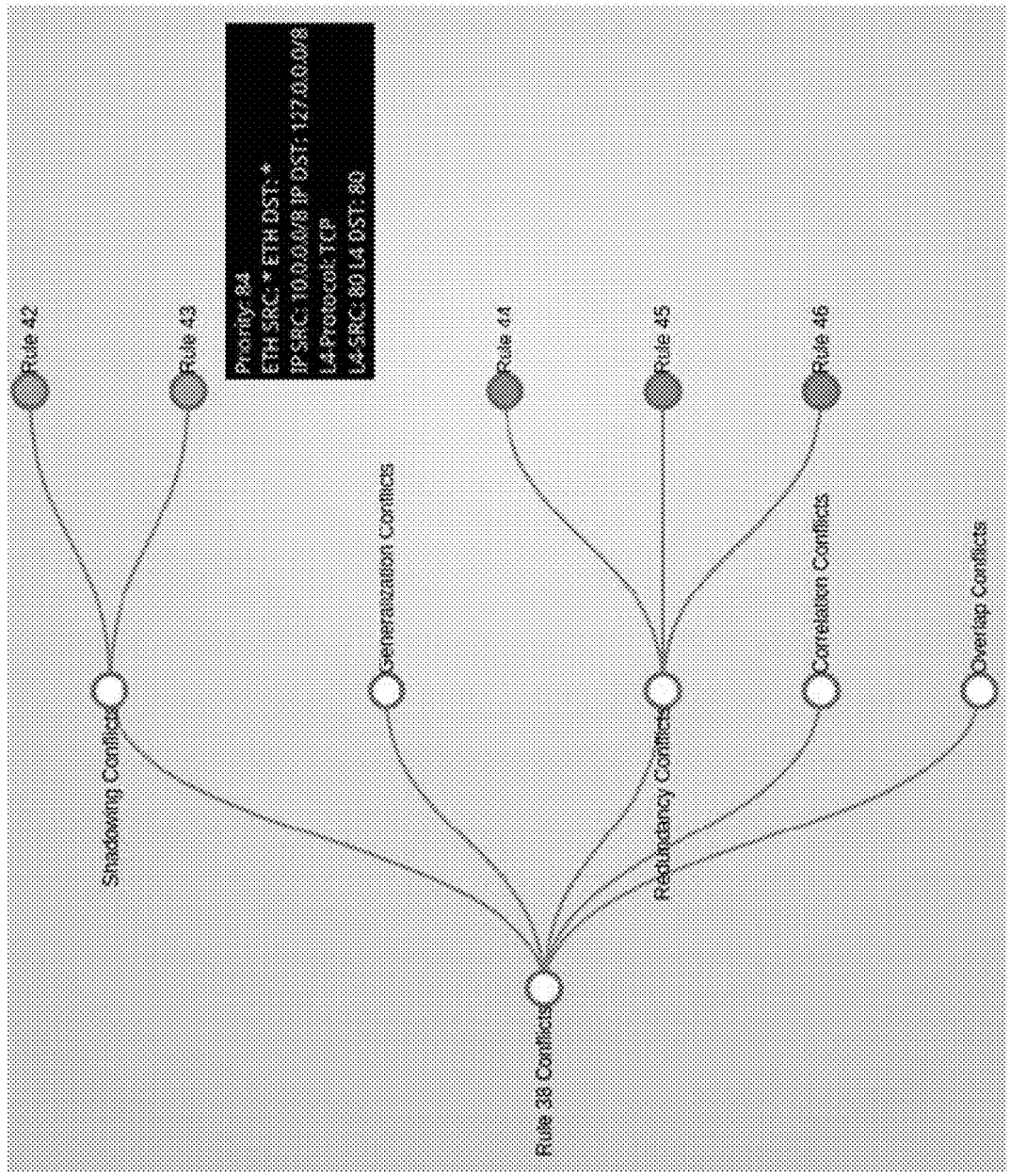
FIG. 9 depicts an image of a Reingold-Tilford tree structure that presents details on rules conflicts according to an embodiment of the present disclosure.

Upon receiving conflict information back from the OFProcessor, the visualization engine details and displays this information in a manner that is both intuitive and concise. The conflict visualization engine may be implemented as a module under the OpenDaylight user interface (DLUX). A hierarchical edge bundling is used to represent the rule relationships using the D3.js JavaScript library. This scheme high-lights the overall relationship between all the flow entries while simultaneously reducing clutter. FIG. 8 shows an example of the hierarchical edge bundling structure 800 showing conflicts in a flow table, with the color of link distinguishing between the relationships between the rules. Details on the conflict between the rules are provided using a Reingold-Tilford tree that presents the details in an aesthetically pleasing and tidy fashion. FIG. 9 shows an interactive Reingold-Tilford tree 900 showing conflicts for a single flow rule.

Figure 3:
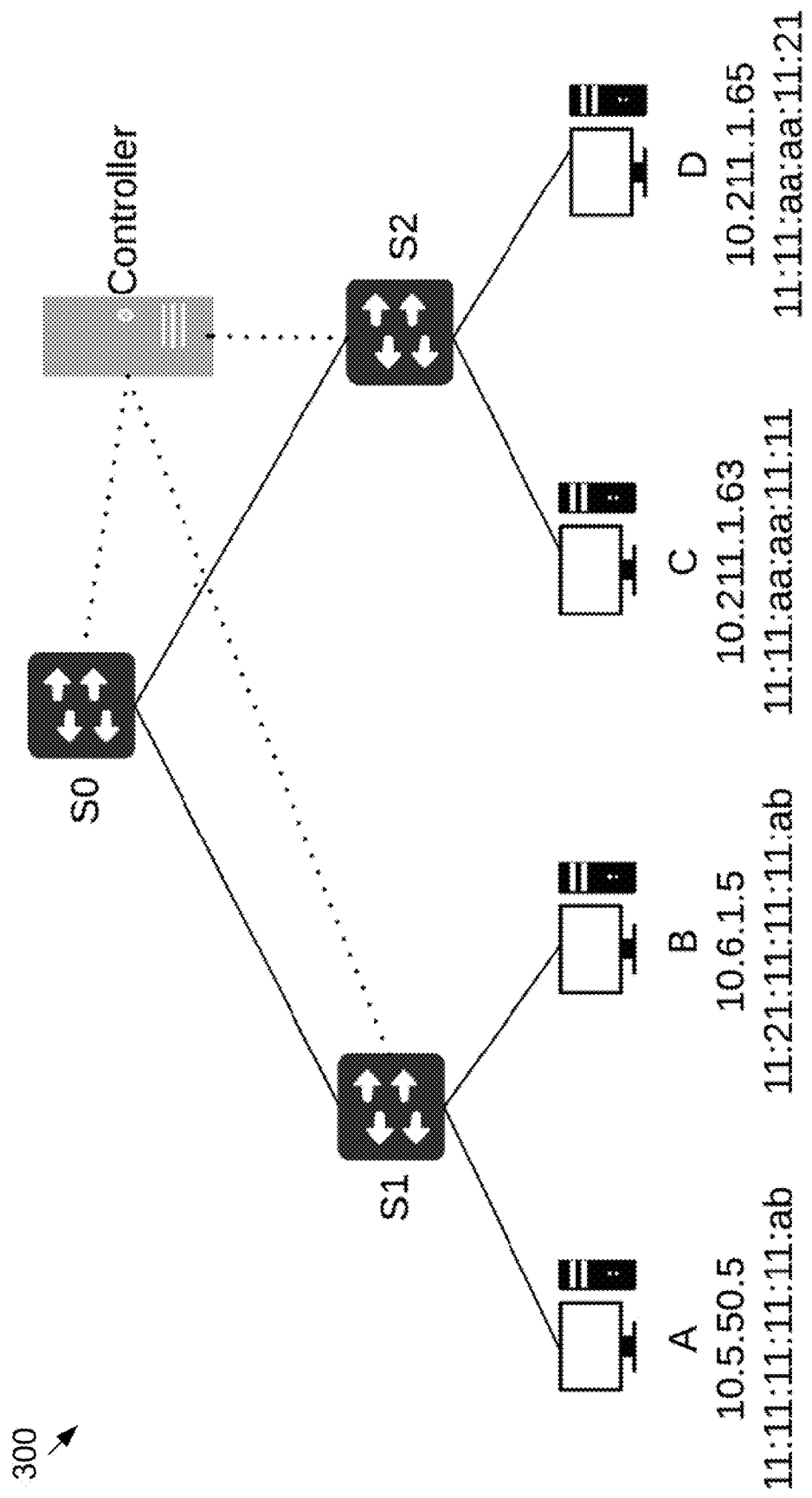
FIG. 3 depicts an example verification test network topology according to an embodiment of the present disclosure.

The OFProcessor module handles the back-end logic of Brew. Its functionalities are compartmentalized as sanitization, conflict detection and conflict resolution. First, the sanitization process obtains the flow rules from the OFAnalyzer and assigns a global priority to the flow based on the decentralization strategy discussed previously. The flow rules are then atomized and the reconciled bit in the data structure 600 shown in FIG. 6 is determined. The Patricia trie data structure is then used as shown in Algorithm 1 to determine and classify conflicts. Since it is known that the layer-3 addresses are fixed length, a path can be followed along from the root to a matching node to obtain flow entries that match the address space of the flow being processed. In cases of wildcard matches, all child nodes of the matching node will represent flow entries conflicting with the input flow. All detected conflicts are classified as shown in FIG. 3. Because any overlaps involving reconciled rules are formally described as imbrication conflict, those rules are processed separately from non-reconciled rules and classified as such. The results are stored in a HashMap, which the OFProcessor sends back to the OFAnalyzer for visualization purposes. The conflict information sent uses an encoding scheme using the unique flow rule identifier thereby ensuring scalability. Next, the conflict resolution module is invoked.

Once the conflicts between different flow rules have been detected, the conflict resolution process attempts to resolve these. The intelligible conflicts are resolved trivially and the interpretative conflicts are resolved using the conflict detection criteria. Since resolution of interpretative conflicts is lossy, Brew has a manual mode, where administrator input using the conflict visualization functionality offered in the OFAnalyzer to help guide an informed decision. Visualization aids such as those shown in FIGS. 8-9 can assist administrators in making an educated decision regarding resolution of interpretative conflicts.

Exemplary Evaluation

Figure 10:
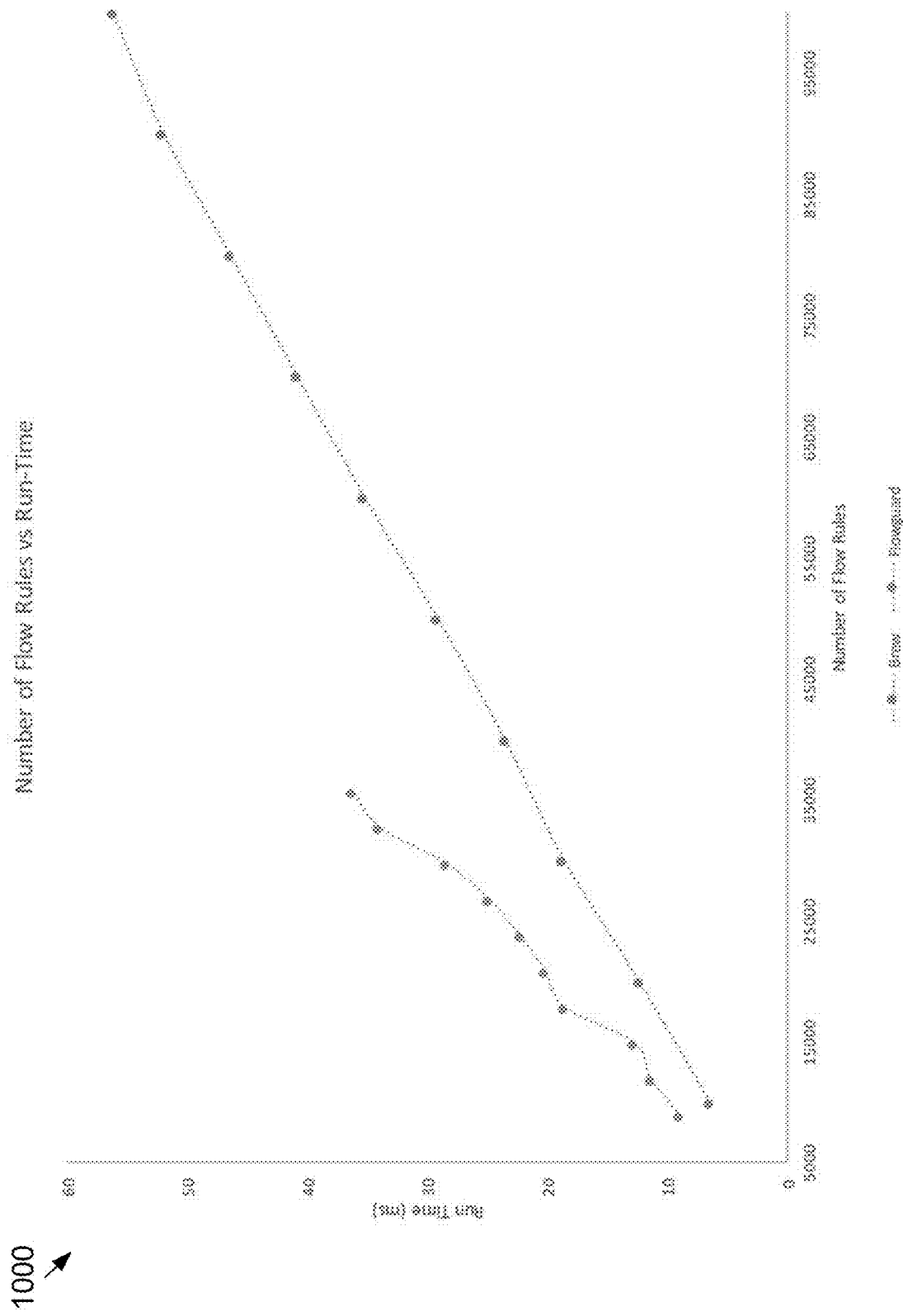
FIG. 10 depicts a graph comparing a performance of the prior Flowguard framework to a running time of Brew according to an embodiment of the present disclosure.

The modules described previously were implemented in JAVA. OpenDaylight (ODL) Lithium was used as the OpenFlow controller and the L2Switch project was employed to connect to the Open vSwitch (OVS) switches. OVS and ODL Lithium support both OpenFlow 1.0 and OpenFlow 1.3. The implementation described herein correctly identifies flow rule conflicts and classifies them, including temporal cross-layer conflicts. Both intelligible and interpretative conflicts are resolved automatically using least privilege and module precedence resolution strategy; and manually using administrator input. A simple network with topology 300 shown in FIG. 3 was implemented on Mininet using a python script. ODL Lithium was used as the OpenFlow controller and the L2Switch project was employed to connect to the Open vSwitch (OVS) switches. OVS and ODL Lithium support both OpenFlow 1.0 and OpenFlow 1.3. OFAnalyzer was evaluated for correctness by providing it with a number of rules that were known to have conflicts. The implementation correctly identified flow rule conflicts and classified them, including temporal cross-layer conflicts. The relationships between the different conflicts were displayed using the visualization techniques discussed previously. In a comparison of Brew with closest prior art frameworks such as FortNox and FlowGuard, it was determined that 20% of the conflicts detected by Brew were imbrication conflicts, which would not have been detected by prior art frameworks. FIG. 10 depicts a graph 1000 comparing a performance of the prior Flowguard framework to a running time of Brew according to an embodiment of the present disclosure.

Figure 11:
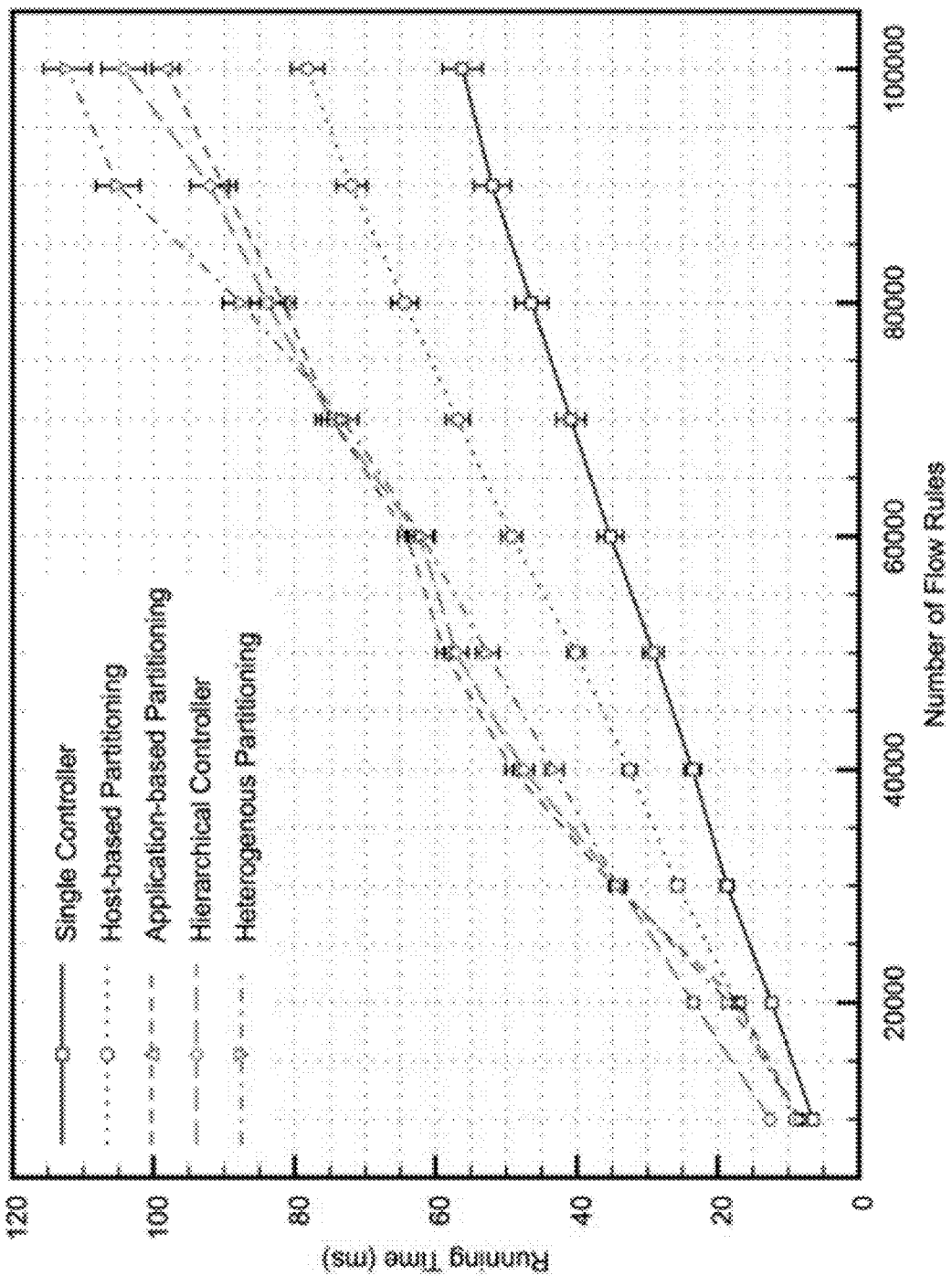
FIG. 11 depicts a graph showing Brew running time for different conflict resolution strategies according to an embodiment of the present disclosure.
Figure 12:
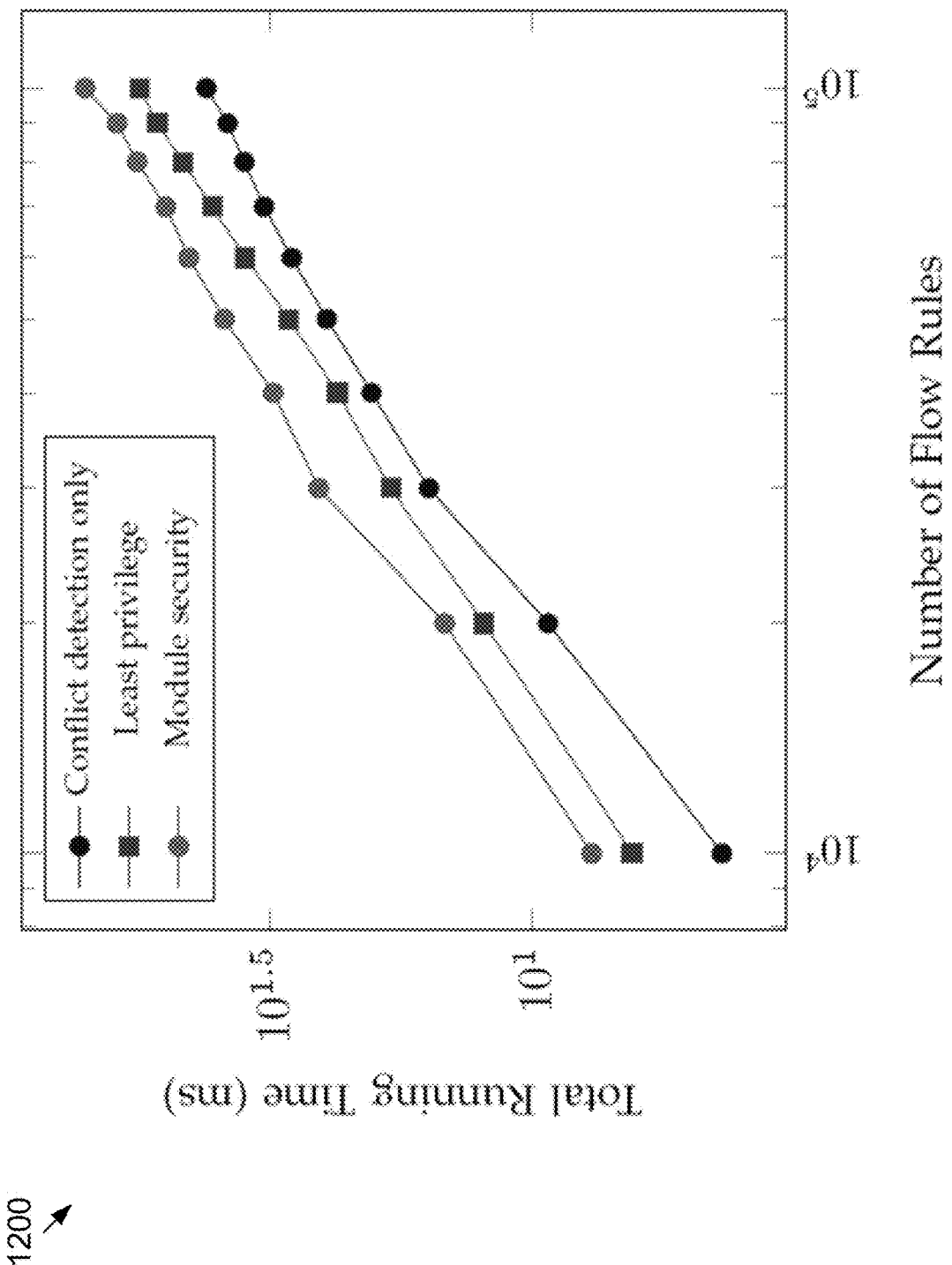
FIG. 12 depicts a graph showing Brew running time for different decentralization strategies according to an embodiment of the present disclosure.

A distributed controller scenario was tested using the application partitioning paradigm. Flows were injected into the controller with weighted priorities giving flows generated from a simulated security application highest preference. The OFAnalyzer extracted flows from the different controllers, and the OFProcessor used the desired weights to make decisions as expected. Similar tests were also run using the hierarchical controller paradigm with results matching expectations. FIG. 11 depicts a graph 1100 that shows the running times for the conflict detection algorithm over the same input set of flow rules running on an application partitioning, host partitioning, and hierarchical distribution strategies. While all shown scenarios show a near linear growth in running times, the application partitioning scenario was noticeably faster. This can be attributed to the presence of a distributed mesh control plane for the application and host partitioning scenarios while having a hierarchical control plane in the hierarchical controller scenario. Scalability of Brew was tested by performing experiments on a topology derived from the Stanford network. Both the conflict detection and resolution algorithms grew in a linear fashion. The time complexity of a lookup on a Patricia trie depends on the length of the string (constant in this case) and the number of flow rules; for a worst case runtime of $O(n)$ and an average case runtime of $O(\log n)$, where n is the number of entries in the flow table. This result was verified experimentally using a 2.5 GHz Intel Core i7 machine with 16 GB DDR3 memory. With an input file containing about 10,000 atomic flow rules, the processing time was about 6.45 ms. Rules were further replicated and inserted into the system to observe growth of computation time. FIG. 12 depicts a graph 1200 that shows results from experimental runs using different input flow table sizes. Ten different test runs were conducted on flow tables of size varying from 10,000 to 100,000 rules and the resulting running times were averaged to get the results in the plot. The results clearly show that Brew effectively identifies flow rule conflicts and takes corrective action in spite of the large data sets. The results also clearly show a worst case of $O(n)$ running time.

Figure 13:
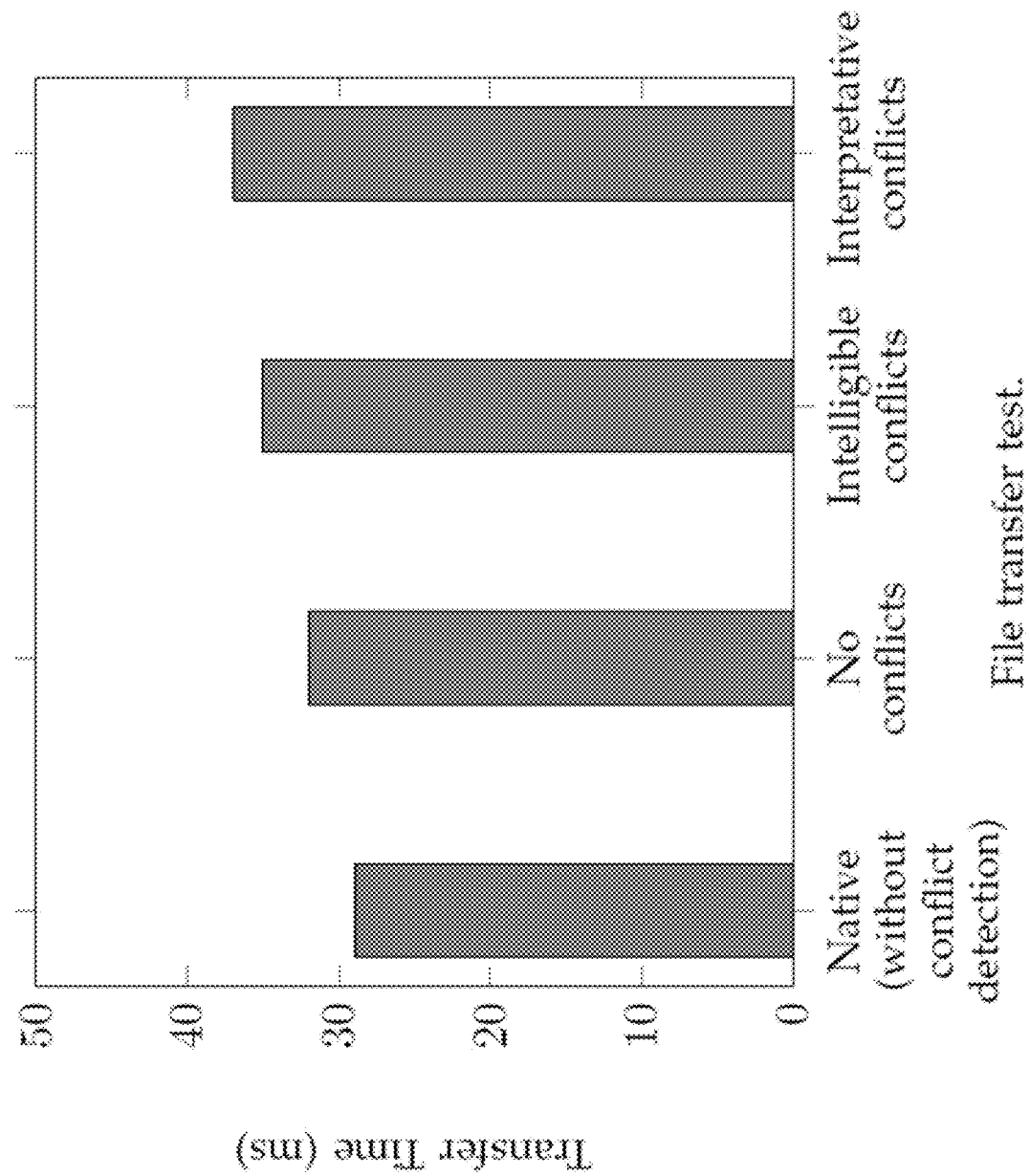
FIG. 13 depicts a graph showing network performance transfer times of the system according to an embodiment of the present disclosure.

The performance overhead of conducting inline rule conflict analysis was analyzed. Once again, the topology shown in FIG. 3 was used for the experiment. The different link bandwidth was enforced using the t c command on Linux. This setup allowed a fine control on the network. A very large file (1 GB) was sent from host A to host D, with a script attempting to add flow rules into the environment. FIG. 13 depicts a graph 1300 that shows the time taken to transfer the file in cases where the rules being inserted were a) conflict free; b) rules had conflicts that could be automatically resolved; and c) conflicts were resolved using least privilege resolution strategy. As expected, when interpretative conflicts were to be resolved, the transfer took longer, due to additional computational needs on the system. Further granular introspection into the data showed that shadowing and redundancy conflicts had the least impact on latency, only because they were the first to be identified in the chained processing. Implementing the disclosed system caused about 5% increase in transfer time (average of 100 test runs). This tradeoff is acceptable in an SDN-based cloud environment since having a conflict free flow table will not only ensure greater confidence in security, but also more optimal packet forwarding processing times.

In large SDN-based cloud environments, this trade-off would be acceptable since having a conflict free flow table will not only ensure greater confidence in security, but also optimal packet forwarding processing times. However, in small to medium size environments, this overhead could be substantial enough to deter adoption.

Exemplary Scalability Evaluation

Figure 14:
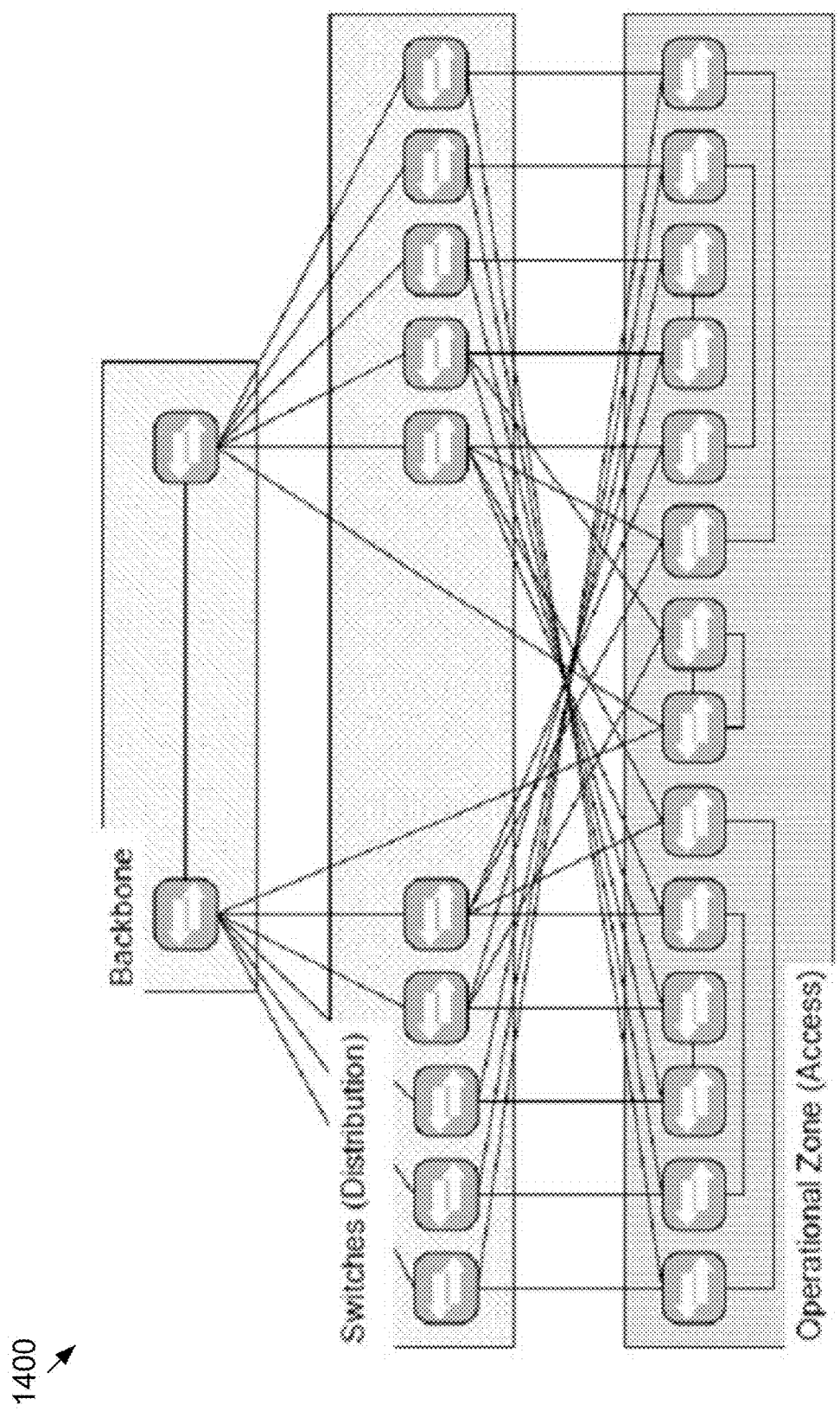
FIG. 14 depicts a network topology for scalability testing according to an embodiment of the present disclosure.

The same input file that was used for verifying correctness (containing 100 atomic flow rules) on the topology shown in FIG. 3 revealed the processing time of about 5.6 μs per rule. A real-world topology was used to test scalability. The Stanford University backbone network was used as a representative mid-size enterprise network. The network consists of fourteen access-layer routers connected using ten distribution switches to two backbone routers. The snapshot of the routing tables and configuration files showed over 12,900 routes, 757,000 forwarding entries, 100 VLANs, and 900 access-list rules. This network topology 1400 was replicated in Mininet using OVS to replace all the switches and routers, but retaining the connectivity information, as shown in FIG. 14. Translating all relevant rules into equivalent OpenFlow rules resulted in approximately 8,900 atomic flow rules, which were then used to run scalability tests. These 8,900 flow rules were used as the source to extrapolate and generate flow rule tables of size 10,000 to 100,000. The extrapolation process randomly picked out the rules from the 8,900 atomic flow rule set.

Figure 15:
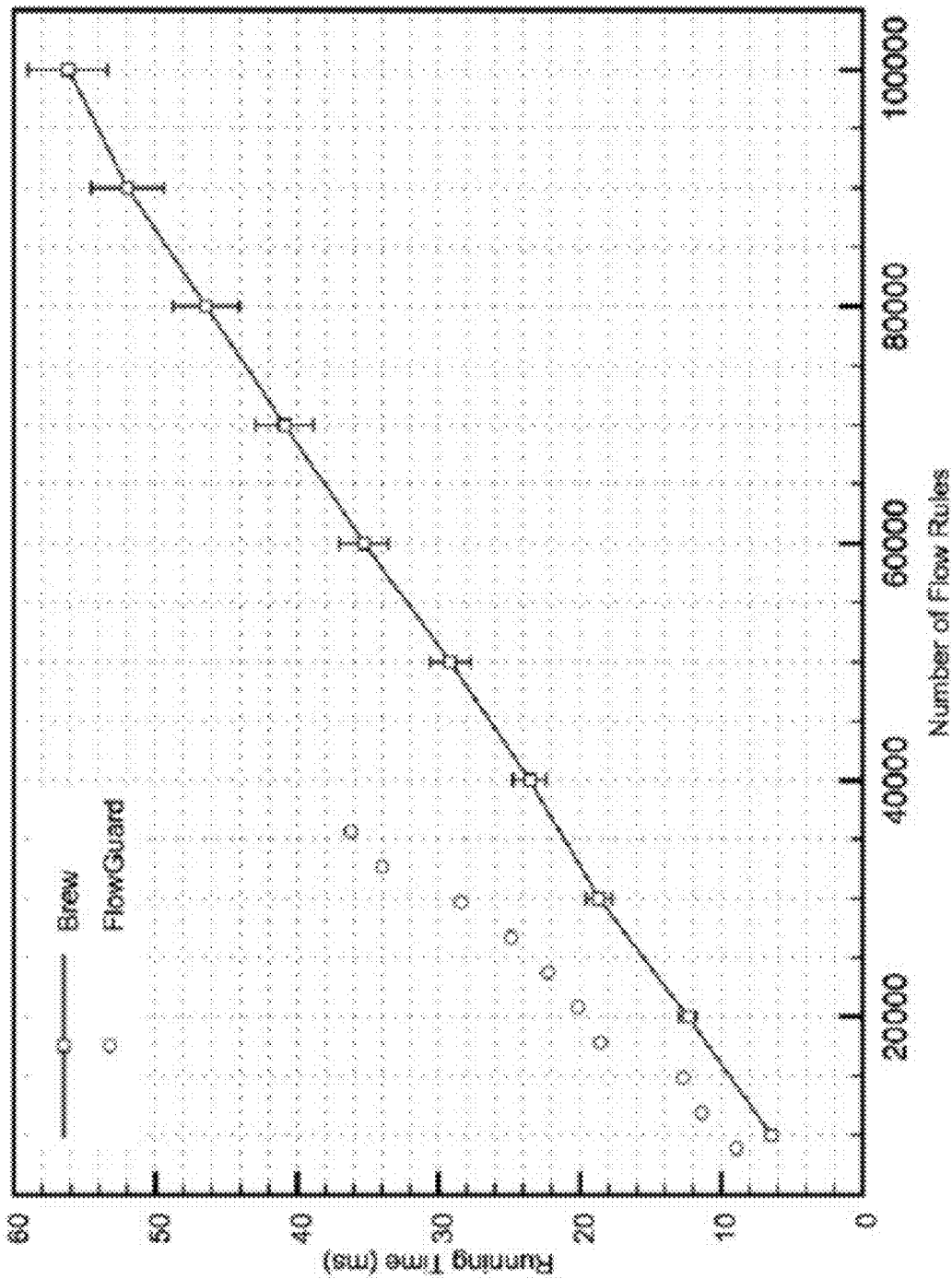
FIG. 15 depicts a graph comparing a performance of the prior Flowguard framework to a running time of Brew according to another embodiment of the present disclosure.

With an input file containing about 10,000 atomic flow rules, the processing time was about 5.6 ms. Rules were further replicated and inserted into the system to observe growth of computation time. FIG. 15 depicts a graph 1500 that shows results from the experiment runs using different input flow table sizes. Ten different test runs were conducted on flow tables of size varying from 10,000 to 100,000 rules, and the resulting running times were averaged to get the results in the plot. The results clearly show a O(n) running time and reveals that Brew effectively identifies flow rule conflicts and takes corrective action in spite of the large data sets. Run times for FortNox are not available and the algorithm complexity is not discussed, but evaluation appears to suggest linear growth; albeit considerably slower (approximately 8 ms per 1,000 flow rules, as opposed to 0.56 ms per 1,000 flow rules for the disclosed system). Running time evaluation for VeriFlow also appears to be linear, but considerably greater, with 1 ms per 10 flow rules. Interestingly, none of the conflicts detected from the Stanford topology was categorized as Imbrication. This can be attributed to all the rules using layer-3 addresses for matching, as is customary in traditional environments.

Effect of Decentralization Strategies

Figure 16:
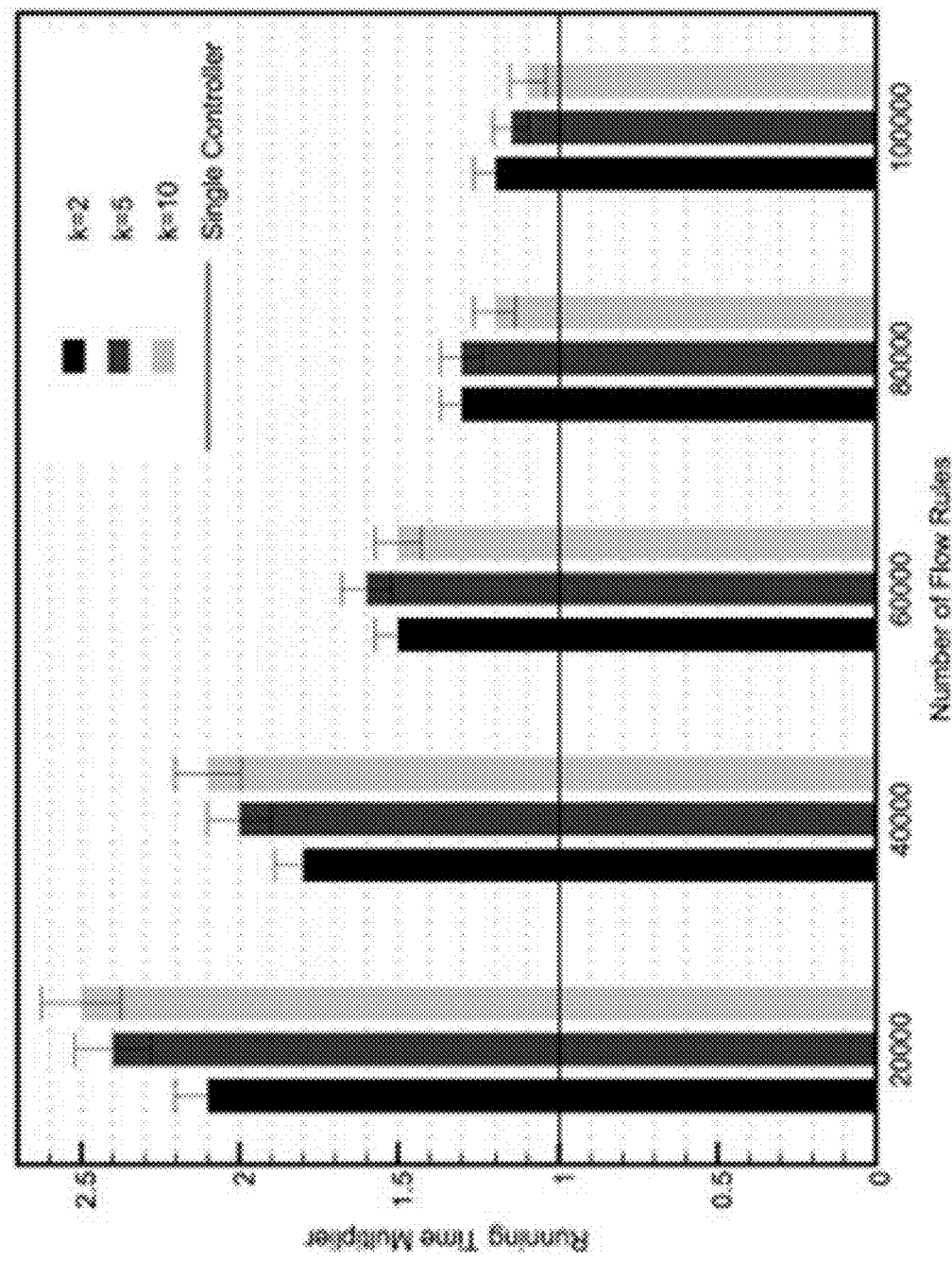
FIG. 16 depicts a graph showing changes in running times of the system with various numbers of controllers according to an embodiment of the present disclosure.

The impact of the distributed environment on policy conflict detection and resolution was studied using two different experiments. First, the number of controllers was changed from a single controller to 2, 5, and 10 using the host-based partitioning scheme. Using the same Stanford backbone network data set, the effect of moving from a single controller to a decentralized controller was studied. At each data point of 20, 40, 60, 80 and 100 thousand total rules, the controllers were assigned flow rules equally. As expected, the running time increased with an increase in the number of controllers, with Brew taking more than twice as much as it did in a single controller environment. However, with an increase in the number of flow rules, the running time in a distributed controller environment asymptotically approached the single controller scenario, as shown in graph 1600 in FIG. 16. This can be attributed to each controller having to deal with fewer flow rules as the number is increased. The graph 1600 also confirms the intuitive fact that with increasing number of flow rules, having more controllers improves performance.

Recent advances in SDN create a unique opportunity to enable complex scientific applications to run on dynamic and tailored infrastructure that includes compute, storage and network resources. This approach provides the performance advantages of strong infrastructure support with little management and deployment costs. However, with several threat vectors for SDN-based cloud environments already being identified and new threats being developed/discovered every day, comprehensive security implementation in an SDN-based cloud is an issue that needs to be dealt with actively and urgently. Traditional approaches to addressing security issues in such dynamic and distributed environments have tried to implement security on individual components and did not considering security holistically. In a multi-tenant SDN-based cloud environment, presence of various such security applications and network nodes interacting with each other makes it extremely difficult to manage policies and track policy conflicts.

The system described herein augments security enforcement in an SDN-based cloud environment by introducing a framework that monitors and maintains a conflict free environment, including strategies to automatically resolve conflicts. The framework addresses indirect conflicts in flow rules and presents techniques to resolve conflicts automatically in a distributed SDN-based cloud. Several approaches that can be used to resolve flow rule conflicts have been discussed previously and their benefits and deficiencies were analyzed. The run time complexity for the framework is linear and hence scalable to large SDN-based clouds. A novel visualization scheme that assists administrators with decision making has been also implemented.

Central to the effort to use policy to implement security is to avoid conflicts, both intra- and inter-policy. There are two potential ways to handle this issue: 1) eliminate setting up conflicting policies; or 2) make runtime decisions when a conflict is detected. Since an implementation that has no conflicts would be ideal, using formal verification methods to set up a conflict-free policy is highly desirable. Currently, Brew accomplishes run time decision making for conflicts. Formal language methodologies can be used to ensure conflicting flow rules do not get generated.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices, systems, and methods are not intended to be limited to the particular forms disclosed. Rather, they include all modifications and alternatives falling within the scope of the claims, and embodiments other than the one shown may include some or all of the features of the depicted embodiment. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method of reducing conflicts between flow rules in a flow table in an SDN-based cloud environment, the method comprising:
   receiving one or more flow rules;
   receiving a data structure comprising a reconciled rule identification field, a controller identification field, a global priority field, and a conflict resolution criteria field;
   separating atomic actions from the one or more flow rules;
   performing a Patricia Trie lookup process on the flow table to determine an address space overlap between the one or more flow rules;

detecting one or more conflicts between the one or more flow rules;
classifying the one or more conflicts into intelligible conflicts and interpretive conflicts;
automatically resolving intelligible conflicts; and
resolving interpretive conflicts based on one or more resolution options contained in the conflict resolution criteria field.

2. The method of claim 1, where the atomic actions comprise permit actions, deny actions, and QoS actions.

3. The method of claim 1, where intelligible conflicts comprise one or more of redundancy conflicts, shadowing conflict, and generalization conflict and interpretive conflicts comprise one or more of correlation conflicts, overlap conflicts, and imbrication conflicts.

4. The method of claim 1, where the one or more resolution options comprise a least privilege option, a module security precedence option, an environmental calibration option, and an administrator assistance option.

5. The method of claim 1, further comprising creating visualization information corresponding to the one or more conflicts detected between the one or more flow rules.

6. The method of claim 1, where the one or more flow rules are received from one or more of a configuration data store and an operational data store.

7. A security policy analysis framework system for reducing conflicts between flow rules in a flow table in distributed SDN-base cloud environments, the system comprising:
an analyzer device comprising a flow extraction engine that receives one or more flow rules and receives a data structure comprising a reconciled rule identification field, a controller identification field, a global priority field, and a conflict resolution criteria field;
a processing device comprising:
a flow prepping engine that separates atomic actions from the one or more flow rules;
a conflict detection engine that performs a Patricia Trie lookup process on the flow table to determine an address space overlap between the one or more flow rules, detects one or more conflicts between the one or more flow rules, and classifies the one or more conflicts into intelligible conflicts and interpretive conflicts; and
a conflict resolution engine that resolves the one or more conflicts based on one or more resolution options contained in the conflict resolution criteria field; and
a controller device.

8. The system of claim 7, where the atomic actions comprise permit actions, deny actions, and QoS actions.

9. The system of claim 7, where intelligible conflicts comprise one or more of redundancy conflicts, shadowing conflict, and generalization conflict and interpretive conflicts comprise one or more of correlation conflicts, overlap conflicts, and imbrication conflicts.

10. The system of claim 7, where the one or more resolution options comprise a least privilege option, a module security precedence option, an environmental calibration option, and an administrator assistance option.

11. The system of claim 7, where the analyzer device further creates visualization information corresponding to the one or more conflicts detected between the one or more flow rules.

12. The system of claim 7, where the one or more flow rules are received from one or more of a configuration data store and an operational data store.

13. A non-transitory computer readable medium storing executable code which, when executed by at least one processor, perform a method of reducing conflicts between flow rules in a flow table in an SDN-based cloud environment, the method comprising:
receiving one or more flow rules;
receiving a data structure comprising a reconciled rule identification field, a controller identification field, a global priority field, and a conflict resolution criteria field;
separating atomic actions from the one or more flow rules;
performing a Patricia Trie lookup process on the flow table to determine an address space overlap between the one or more flow rules;
detecting one or more conflicts between the one or more flow rules;
classifying the one or more conflicts into intelligible conflicts and interpretive conflicts;
automatically resolving intelligible conflicts; and
resolving interpretive conflicts based on one or more resolution options contained in the conflict resolution criteria field.

14. The medium of claim 13, where the method further comprises creating visualization information corresponding to the one or more conflicts detected between the one or more flow rules.

* * * * *